United States Patent
Wakabayashi et al.

(10) Patent No.: US 12,092,947 B2
(45) Date of Patent: Sep. 17, 2024

(54) LIGHT SOURCE DEVICE AND PROJECTOR

(71) Applicant: SEIKO EPSON CORPORATION, Tokyo (JP)

(72) Inventors: Shinichi Wakabayashi, Suwa (JP); Kunihiko Takagi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1 day.

(21) Appl. No.: 17/841,732

(22) Filed: Jun. 16, 2022

(65) Prior Publication Data
US 2022/0404690 A1 Dec. 22, 2022

(30) Foreign Application Priority Data
Jun. 17, 2021 (JP) ................. 2021-100706

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
CPC .. G03B 21/204; G03B 21/16; G03B 21/2013; G03B 21/2033; G03B 21/2066; G03B 21/2073; G02B 26/008; G02B 26/0816; G02B 27/141; G02B 27/149; G02B 27/1026

See application file for complete search history.

(56) References Cited

U.S. PATENT DOCUMENTS

| | | | | |
|---|---|---|---|---|
| 2016/0373705 A1* | 12/2016 | Hashizume | ........ | G02B 27/0955 |
| 2018/0088453 A1* | 3/2018 | Yasumatsu | ......... | G03B 21/2073 |
| 2018/0217481 A1* | 8/2018 | Hama | .................. | G03B 21/204 |
| 2021/0063857 A1* | 3/2021 | Akiyama | ............. | G03B 21/204 |
| 2021/0382381 A1* | 12/2021 | Akiyama | ............ | G03B 21/2066 |
| 2021/0382383 A1* | 12/2021 | Koizumi | ............... | G03B 21/204 |
| 2022/0066305 A1* | 3/2022 | Akagawa | ............. | G03B 21/204 |
| 2022/0086407 A1* | 3/2022 | Akiyama | ............. | H04N 9/3158 |
| 2022/0299856 A1* | 9/2022 | Uchiyama | .......... | G03B 21/2066 |

FOREIGN PATENT DOCUMENTS

| | | | | |
|---|---|---|---|---|
| CN | 208367333 U | * | 1/2019 | .......... G02B 26/008 |
| JP | 2016-173390 | | 9/2016 | |

* cited by examiner

*Primary Examiner* — Magda Cruz
(74) *Attorney, Agent, or Firm* — Dority & Manning, P.A.

(57) ABSTRACT

A light source device includes a first light source configured to emit first color light, a wavelength conversion element configured to convert a wavelength of excitation light made incident thereon and emit converted light having a wavelength larger than the wavelength of the excitation light, and an emission-position changing mechanism configured to change an emission position of the incident excitation light to thereby change an incident position of the excitation light on the wavelength conversion element and change an emission position of the first color light and an emission position of the converted light in the same direction in synchronization with each other.

16 Claims, 13 Drawing Sheets

LIGHT SOURCE DEVICE AND PROJECTOR

The present application is based on, and claims priority from JP Application Serial Number 2021-100706, filed Jun. 17, 2021, the disclosure of which is hereby incorporated by reference herein in its entirety.

BACKGROUND

1. Technical Field

The present disclosure relates to a light source device and a projector.

2. Related Art

There has been known a projector including an illumination device capable of changing an incident position of blue light on a rotating fluorescent plate (see, for example, JP-A-2016-173390 (Patent Literature 1)).

The projector described in Patent Literature 1 includes a first illumination device and a second illumination device. The first illumination device includes a light source device, a dichroic mirror, a reflection mirror, a driving element, and a rotating fluorescent plate. Blue light emitted from the light source device is made incident on the reflection mirror after being transmitted through the dichroic mirror. The blue light made incident on the reflection mirror is reflected by the reflection mirror and made incident on the rotating fluorescent plate, subjected to wavelength conversion by the rotating fluorescent plate, and emitted as fluorescent light. The fluorescent light emitted from the rotating fluorescent plate is made incident on the dichroic mirror via the reflection mirror, reflected by the dichroic mirror, and emitted to the outside of the first illumination device. The driving element rotates the reflection mirror centering on a rotation axis set in a direction approximately 90 degrees different from a rotation axis of the rotating fluorescent plate. Consequently, the driving element changes an incident position of the blue light on the rotating fluorescent plate.

The second illumination device includes a second light source device, a condensing optical system, a scatter plate, a polarization conversion integrator rod, and a condensing lens. Blue light emitted from the second light source device is made incident on the scatter plate via the condensing optical system and scattered by the scatter plate. The polarization conversion integrator rod uniformizes an in-plane light intensity distribution of the blue light made incident from the scatter plate and converts the blue light into linearly polarized light. The blue light emitted from the polarization conversion integrator rod is emitted to the outside of the second illumination device via the condensing lens.

However, in the projector described in Patent Literature 1, whereas the center axis of the fluorescent light emitted from the first illumination device is moved according to the rotation of the reflection mirror by the driving element, the center axis of the blue light emitted from the second illumination device is fixed. Accordingly, when the fluorescent light emitted from the first illumination device and the blue light emitted from the second illumination device are combined, color unevenness occurs in combined light of the fluorescent light and the blue light.

When green light and red light included in such fluorescent light and the blue light are modulated by a light modulation device to form an image obtained by combining the color lights, color unevenness occurs in the formed image.

SUMMARY

A light source device according to a first aspect of the present disclosure includes: a first light source configured to emit first color light; a wavelength conversion element configured to convert a wavelength of excitation light made incident thereon and emit converted light having a wavelength larger than the wavelength of the excitation light; and an emission-position changing mechanism configured to change an emission position of the incident excitation light to thereby change an incident position of the excitation light on the wavelength conversion element and change an emission position of the first color light and an emission position of the converted light in a same direction in synchronization with each other.

A projector according to a second aspect of the present disclosure includes: the light source device according to the first aspect; an image emission device configured to modulate light emitted from the light source device and emit the modulated light as image light; and a projection optical device configured to project the image light emitted from the image emission device.

DESCRIPTION OF EXEMPLARY EMBODIMENTS

First Embodiment

Figure 1:
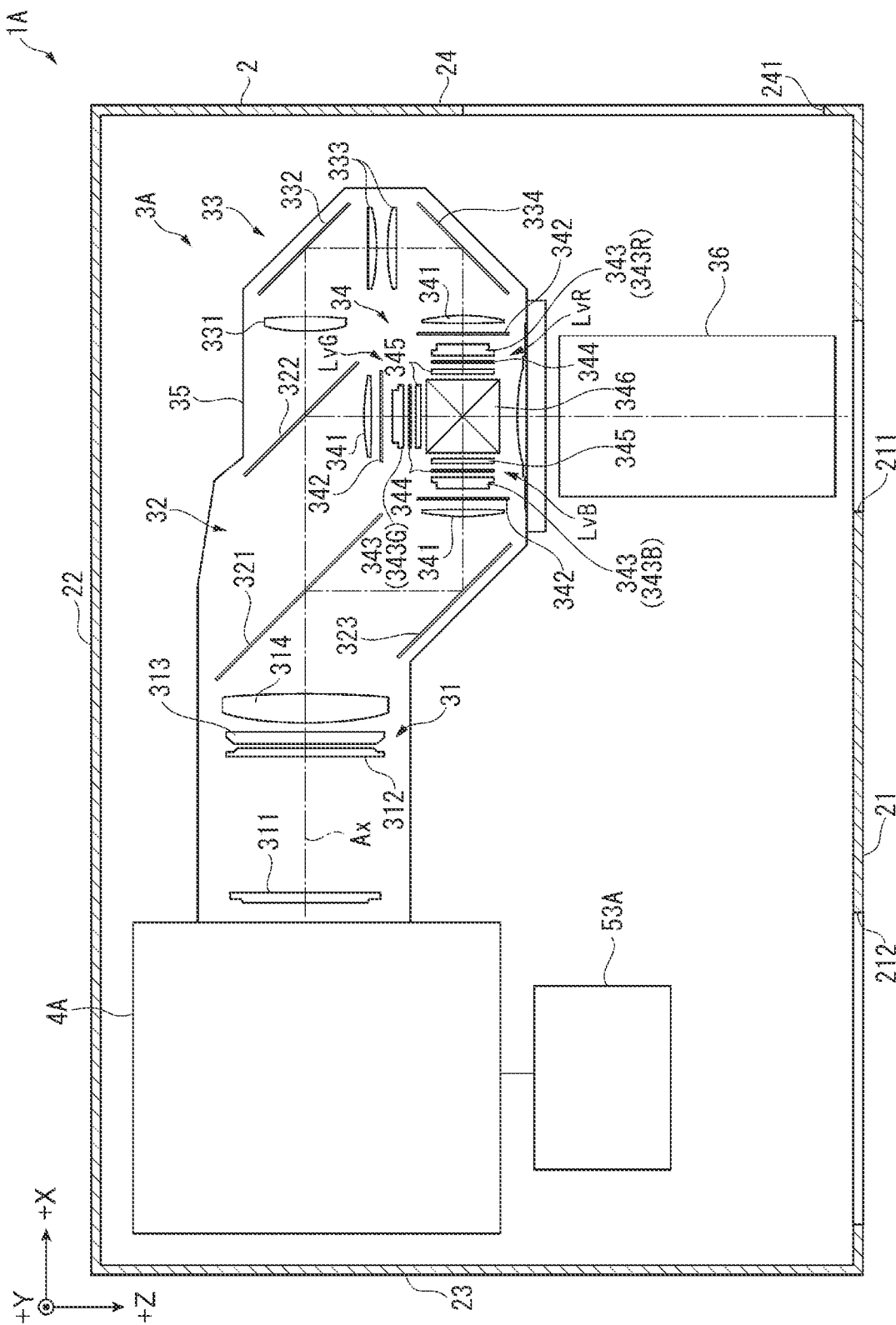
FIG. 1 is a schematic diagram showing the configuration of a projector in a first embodiment.

A first embodiment of the present disclosure is explained below with reference to the drawings.
Schematic Configuration of a Projector
FIG. 1 is a schematic diagram showing the configuration of a projector 1A according to this embodiment.

The projector 1A according to this embodiment modulates light emitted from a light source device 4A to form image light corresponding to image information and enlarges and projects the formed image light onto a projection surface such as a screen. The projector 1A includes, as shown in FIG. 1, an exterior housing 2 and an image projection device 3A.

Besides, although not illustrated, the projector 1A includes a control device that controls the operation of the projector 1A, a power supply device that supplies electric power to electronic components configuring the projector 1A, and a cooling device that cools cooling targets configuring the projector 1A.
Configuration of the Exterior Housing The exterior housing 2 configures an exterior of the projector 1A and houses the image projection device 3A, the control device, the power supply device, and the cooling device on the inside.

The exterior housing 2 includes a front surface section 21, a rear surface section 22, a left side surface section 23, and a right side surface section 24. Although not illustrated, the exterior housing 2 includes a top surface section that couples one end portions in the surface sections 21 to 24 and a bottom surface section that couples the other end portions in the surface sections 21 to 24. The exterior housing 2 is formed in, for example, a substantially rectangular parallelepiped shape.

The front surface section 21 includes a passage port 211 located substantially in the center in the front surface section 21. Light projected from a projection optical device 36 explained below passes through the passage port 211.

The front surface section 21 includes an exhaust port 212 located on the left side surface section 23 side in the front surface section 21.

The exhaust port 212 discharges cooling gas having cooled the cooling targets provided in the exterior housing 2 to the outside of the exterior housing 2.

The right side surface section 24 includes an intake port 241. The intake port 241 introduces air on the outside of the exterior housing 2 to the inside of the exterior housing 2 as a cooling gas. In the intake port 241, a filter for catching dust included in the air passing through the intake port 241 may be provided.

In the following explanation, three directions orthogonal to one another are represented as a +X direction, a +Y direction, and a +Z direction. The +X direction is a direction from the left side surface section 23 to the right side surface section 24. The +X direction is along a direction in which the light source device 4A explained below emits illumination light to a uniformizing device 31 in the image projection device 3A. The +Y direction is a direction from the bottom surface section to the top surface section. The +Z direction is a direction from the rear surface section 22 to the front surface section 21. When viewed from the +Y direction, the +Z direction is along a direction in which the projection optical device 36 explained below projects image light in the image projection device 3A. Although not illustrated, the opposite direction of the +X direction is represented as a −X direction, the opposite direction of the +Y direction is represented as a −Y direction, and the opposite direction of the +Z direction is represented as a −Z direction.
Configuration of the Image Projection Device The image projection device 3A forms image light corresponding to image information input from the control device and projects the formed image light. The image projection device 3A includes the light source device 4A, a uniformizing device 31, a color separation device 32, a relay device 33, an image emission device 34, a housing for optical components 35, and projection optical device 36.

The configuration of the light source device 4A is explained in detail below.

The uniformizing device 31 uniformizes light emitted from the light source device 4A. The uniformized light illuminates, through the color separation device 32 and the relay device 33, modulation regions for modulating incident light in light modulation devices 343 explained below. The uniformizing device 31 includes two lens arrays 311 and 312, a polarization conversion element 313, and a superimposing lens 314.

The color separation device 32 separates light made incident from the uniformizing device 31 into red, green, and blue color lights. The color separation device 32 includes two dichroic mirrors 321 and 322 and a reflection mirror 323 that reflects the blue light separated by the dichroic mirror 321.

The relay device 33 is provided on an optical path of the red light longer than optical paths for the other color lights and suppresses a loss of the red light. The relay device 33 includes an incident side lens 331, a relay lens 333, and reflection mirrors 332 and 334. In this embodiment, the relay device 33 is provided on the optical path of the red light.

However, not only this, but, for example, color light having a longer optical path than the other color lights may be the blue light and the relay device 33 may be provided on the optical path of the blue light.

The image emission device 34 modulates light emitted from the light source device 4A and emits the modulated light as image light. Specifically, the image emission device 34 modulates the red, green, and blue color lights separated by the color separation device 32 and emits image light obtained by combining the modulated color lights. The image emission device 34 includes three field lenses 341, three incident side polarization plates 342, three light modulation devices 343, three viewing angle compensation plates 344, and three emission side polarization plates 345 provided according to the incident color lights and one color combining section 346.

The light modulation devices 343 modulate, according to image information, light emitted from the light source device 4A. The three light modulation devices 343 include a light modulation device 343R that modulates the red light, a light modulation device 343G that modulates the green light, and a light modulation device 343B that modulates the blue light. The light modulation devices 343 are configured by transmission-type liquid crystal panels. A liquid crystal light valve is configured by the incident side polarization plates 342, the light modulation devices 343, and the emission side polarization plates 345.

That is, the image emission device 34 includes liquid crystal light valves LvR, LvG, and LvB. The liquid crystal light valve LvR is configured by the incident side polarization plate 342, the light modulation device 343, and the emission side polarization plate 345 for the red light. The liquid crystal light valve LvG is configured by the incident side polarization plate 342, the light modulation device 343, and the emission side polarization plate 345 for the green light. The liquid crystal light valve LvB is configured by the incident side polarization plate 342, the light modulation device 343, and the emission side polarization plate 345 for the blue light.

The color combining section 346 combines the three color lights modulated by the light modulation devices 343B, 343G, and 343R to form image light and emits the formed image light to the projection optical device 36.

In this embodiment, the color combining section 346 is configured by a cross dichroic prism. However, not only this, but the color combining section 346 can be configured by, for example, a plurality of dichroic mirrors as well.

The housing for optical components 35 houses the devices 31 to 34 on the inside. An illumination optical axis Ax, which is an optical axis in design, is set in the image projection device 3A. The housing for optical components 35 holds the devices 31 to 34 in predetermined positions on the illumination optical axis Ax. The light source device 4A and the projection optical device 36 are disposed in predetermined positions on the illumination optical axis Ax.

The projection optical device 36 is a projection lens that enlarges and projects image light made incident from the image emission device 34 onto a projection surface. That is, the projection optical device 36 projects image light emitted from the light modulation devices 343. As the projection optical device 36, a group lens including a plurality of lenses and a tubular lens barrel in which the plurality of lenses are housed can be illustrated.

Configuration of the Light Source Device

Figure 2:
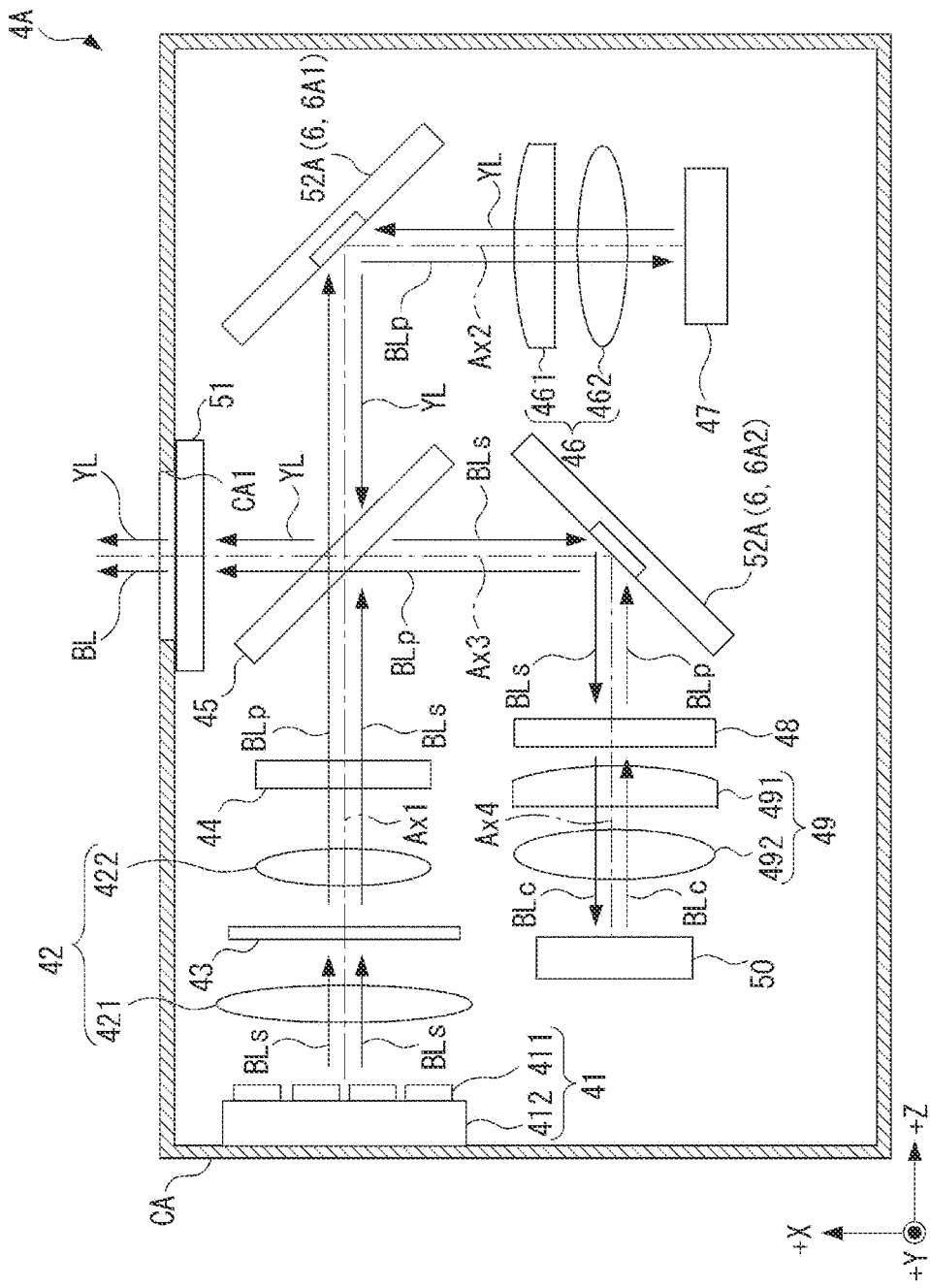
FIG. 2 is a schematic diagram showing the configuration of a light source device in the first embodiment.

FIG. 2 is a schematic diagram showing the configuration of the light source device 4A.

The light source device 4A emits illumination light for illuminating the modulation regions of the light modulation devices 343 to the uniformizing device 31. The light source device 4A includes a first light source 41, an afocal optical element 42, a first phase difference element 43, a diffusing and transmitting element 44, a light separating and combining element 45, a first condensing element 46, a wavelength conversion element 47, a second phase difference element 48, a second condensing element 49, a diffusion optical element 50, a third phase difference element 51, an emission-position changing mechanism 52A, a control section 53A (see FIG. 1), and a housing for light source CA.

In the light source device 4A, illumination optical axes Ax1, Ax2, Ax3, and Ax4 are set.

The illumination optical axes Ax1 and Ax4 are parallel to the +Z direction. The illumination optical axis Ax1 crosses the illumination optical axes Ax2 and Ax3. The illumination optical axis Ax4 is set in the −X direction with respect to the illumination optical axis Ax1 and crosses the illumination optical axis Ax3.

The illumination optical axes Ax2 and Ax3 are parallel to the +X direction. The illumination optical axis Ax2 is set in the +Z direction with respect to the illumination optical axis Ax3. The illumination optical axis Ax3 coincides with the illumination optical axis Ax in the position of the lens array 311. In other words, the illumination optical axis Ax3 is set on an extended line of the illumination optical axis Ax.

The first light source 41, the afocal optical element 42, the first phase difference element 43, the diffusing and transmitting element 44, the light separating and combining element 45, and an emission-position changing element 6 (6A1) explained below of the emission-position changing mechanism 52A are disposed on the illumination optical axis Ax1.

The emission-position changing element 6A1, the first condensing element 46, and the wavelength conversion element 47 are disposed on the illumination optical axis Ax2.

That is, the emission-position changing element 6A1 is disposed in a crossing part of the illumination optical axis Ax1 and the illumination optical axis Ax2.

The third phase difference element 51, the light separating and combining element 45, and an emission-position changing element 6A2 explained below of the emission-position changing mechanism 52A are disposed on the illumination optical axis Ax3.

That is, the light separating and combining element 45 is disposed in a crossing part of the illumination optical axis Ax1 and the illumination optical axis Ax3.

The emission-position changing element 6A2, the second phase difference element 48, the second condensing element 49, and the diffusion optical element 50 are disposed on the illumination optical axis Ax4.

That is, the emission-position changing element 6A2 is disposed in a crossing part of the illumination optical axis Ax3 and the illumination optical axis Ax4.

Configuration of the Housing for Light Source

The housing for light source CA houses the first light source 41, the afocal optical element 42, the first phase difference element 43, the diffusing and transmitting element 44, the light separating and combining element 45, the first condensing element 46, the wavelength conversion element 47, the second phase difference element 48, the second condensing element 49, the diffusion optical element 50, the third phase difference element 51, and the emission-position changing mechanism 52A. The control section 53A is provided in the housing for light source CA.

An opening section CA1 through which illumination light passes in the +X direction is provided in a surface in the +X direction in the housing for light source CA.

Configuration of the First Light Source

The first light source 41 emits blue light, which is first color light. Specifically, the first light source 41 emits the blue light in the +Z direction along the illumination optical axis Ax1. The first light source 41 includes a plurality of solid-state light sources 411 and a substrate 412.

Each of the plurality of solid-state light sources 411 is configured by a semiconductor laser that emits the blue light. Specifically, the solid-state light sources 411 emit s-polarized blue light BLs in the +Z direction to the light separating and combining element 45.

The solid-state light sources 411 may be configured to emit p-polarized blue light to the light separating and combining element 45. The blue light BLs is, for example, laser light having a peak wavelength of 440 nm. The blue light BLs emitted from the plurality of solid-state light sources 411 is made incident on the afocal optical element 42.

The substrate 412 supports the plurality of solid-state light sources 411. The substrate 412 is formed of, for example, a material such as metal that easily transmits heat and is fixed to the housing for light source CA. Accordingly, heat generated in the plurality of solid-state light sources 411 when the plurality of solid-state light sources 411 emit lights is transmitted to the housing for light source CA via the substrate 412 and discharged to the outside of the housing for light source CA.

The substrate 412 may include, for example, a heat radiating member including a plurality of fins. In this case, the heat radiating member may be exposed to the outside of the housing for light source CA.

Configurations of the Afocal Optical Element and the First Phase Difference Element The afocal optical element 42 is provided in the +Z direction with respect to the first light source 41. The afocal optical element 42 reduces a light beam diameter of the blue light BLs emitted from the first light source 41. The afocal optical element 42 is configured by a lens 421 that condenses light made incident thereon and a lens 422 that collimates a light beam condensed by the lens 421.

The first phase difference element 43 converts a part of the blue light BLs emitted from the first light source 41 into p-polarized blue light BLp. That is, the blue light emitted from the first phase difference element 43 is light in which the s-polarized blue light BLs and the p-polarized blue light BLp are mixed.

A ratio of the blue light BLp to the blue light emitted from the first phase difference element 43, that is, ratios of the blue light BLs and the blue light BLp can be changed as appropriate. In this embodiment, the first phase difference element 43 is disposed between the lens 421 and the lens 422.

However, not only this, but the first phase difference element 43 may be provided between the lens 422 and the light separating and combining element 45.

Configuration of the Diffusing and Transmitting Element

The diffusing and transmitting element 44 is disposed in the +Z direction with respect to the afocal optical element 42 and uniformizes an illuminance distribution of the blue lights BLs and BLp made incident from the afocal optical element 42. As the diffusing and transmitting element 44, a configuration including a hologram, a configuration in which a plurality of small lenses are arrayed on an optical axis orthogonal surface, and a configuration in which a light passing surface is a rough surface can be illustrated.

A homogenizer optical element including a pair of multi-lenses may be adopted instead of the diffusing and transmitting element 44.

Configuration of the Light Separating and Combining Element

The light separating and combining element 45 is provided in the +Z direction with respect to the diffusing and transmitting element 44.

The light separating and combining element 45 is a polarization beam splitter that separates a p-polarized light component and an s-polarized light component included in light made incident thereon. The light separating and combining element 45 reflects the s-polarized light component and transmits the p-polarized light component. That is, the light separating and combining element 45 has a light separation characteristic for separating a part of light made incident thereon and the remaining light. In this embodiment, the light separating and combining element 45 reflects the blue light BLs and transmits the blue light BLp of the blue lights BLs and BLp made incident from the diffusing and transmitting element 44. The light separating and combining element 45 reflects light having a predetermined wavelength or more irrespective of whether a polarized light component is an s-polarized light component or a p-polarize light component. In this embodiment, the light separating and combining element 45 reflects light having a wavelength larger than a wavelength of the blue light. Specifically, the light separating and combining element 45 reflects fluorescent light YL emitted from the wavelength conversion element 47 explained below.

The light separating and combining element 45 may have a function of a half mirror for transmitting a part of light made incident thereon and reflecting the remaining light and a function of a dichroic mirror for transmitting the blue light and reflecting the fluorescent light YL. In this case, the first phase difference element 43 and the second phase difference element 48 can be omitted.

The blue light BLp transmitted through the light separating and combining element 45 in the +Z direction is made incident on the emission-position changing element 6A1 of the emission-position changing mechanism 52A. The blue light BLp made incident on the emission-position changing element 6A1 is reflected in the −X direction and thereafter made incident on the first condensing element 46 along the illumination optical axis Ax2.

The blue light BLs reflected in the −X direction by the light separating and combining element 45 travels along the illumination optical axis Ax3 and is made incident on the emission-position changing element 6 (6A2) of the emission-position changing mechanism 52A.

The blue light BLp made incident on the emission-position changing element 6A2 is reflected in the −Z direction by the emission-position changing element 6A2 and made incident on the second phase difference element 48 along the illumination optical axis Ax4.

The configuration of the emission-position changing mechanism 52A is explained in detail below.

Configuration of the First Condensing Element

The first condensing element 46 is disposed in the −X direction with respect to the emission-position changing element 6A1 and condenses, in the wavelength conversion element 47, the blue light BLp reflected by the emission-position changing element 6A1. The first condensing element 46 collimates the fluorescent light YL made incident in the +X direction from the wavelength conversion element 47 and emits the fluorescent light YL to the emission-position changing element 6A1.

The first condensing element 46 is configured by the two lenses 461 and 462. However, the number of lenses configuring the first condensing element 46 can be changed as appropriate.

Configuration of the Wavelength Conversion Element

The wavelength conversion element 47 converts a wavelength of light made incident thereon. Specifically, the wavelength conversion element 47 is a reflection-type wavelength conversion element that converts the first color light made incident thereon into converted light having a wavelength larger than a wavelength of the first color light and emits the converted light to an incident side of the first color light.

Specifically, the wavelength conversion element 47 converts the blue light BLp made incident thereon into the fluorescent light YL having a wavelength larger than a wavelength of the blue light BLp and emits the fluorescent light YL to an incident side of the blue light BLp. The blue light BLp is equivalent to excitation light for exciting a phosphor included in the wavelength conversion element 47. The fluorescent light YL is equivalent to the converted light having the wavelength larger than the wavelength of the first color light.

Although not illustrated, the wavelength conversion element 47 includes a wavelength conversion layer containing a phosphor that converts a wavelength of the blue light BLp made incident thereon, a reflection layer that reflects the fluorescent light YL generated in the wavelength conversion layer, and a substrate. The substrate supports the wavelength conversion layer and the reflection layer.

The wavelength conversion element 47 may be a phosphor wheel rotated by a rotating device centering on a turning axis extending along the illumination optical axis Ax2.

The fluorescent light YL emitted in the +X direction from the wavelength conversion element 47 is made incident on the emission-position changing element 6A1 via the first condensing element 46. The emission-position changing element 6A1 reflects, in the −Z direction, the fluorescent light YL made incident from the first condensing element 46 and makes the fluorescent light YL incident on the light separating and combining element 45.

The light separating and combining element 45 reflects, in the +X direction, the fluorescent light YL made incident in the −Z direction. Consequently, the fluorescent light YL is combined with the blue light BLp passing in the +X direction in the light separating and combining element 45 and is made incident on the third phase difference element 51.

Configuration of the Second Phase Difference Element

The second phase difference element 48 is disposed in the −Z direction with respect to the emission-position changing element 6A2.

The second phase difference element 48 converts the blue light BLs made incident from the emission-position changing element 6A2 into circularly polarized blue light BLc.

The second phase difference element 48 converts the circularly polarized blue light BLc made incident in the +Z direction from the second condensing element 49 into the p-polarized blue light BLp.

Configuration of the Second Condensing Element

The second condensing element 49 is disposed in the −Z direction with respect to the second phase difference element 48. The second condensing element 49 condenses, in the diffusion optical element 50, the blue light BLc made incident in the −Z direction from the second phase difference element 48.

The second condensing element 49 collimates the blue light BLc made incident in the +Z direction from the diffusion optical element 50 and emits the blue light BLc to the second phase difference element 48.

In an example shown in FIG. 2, the second condensing element 49 is configured by the two lenses 491 and 492. However, the number of lenses configuring the second condensing element 49 does not matter.

Configuration of the Diffusion Optical Element

The diffusion optical element 50 is disposed in the −Z direction with respect to the second condensing element 49. The diffusion optical element 50 reflects and diffuses the blue light BLc made incident thereon at the same diffusion angle as a diffusion angle of the fluorescent light YL emitted from the wavelength conversion element 47.

That is, the blue light reflected and separated by the light separating and combining element 45 is made incident on the diffusion optical element 50 via the emission-position changing element 6A2, the second phase difference element 48, and the second condensing element 49. The blue light BLc reflected by the diffusion optical element 50 is made incident on the emission-position changing element 6A2 via the second condensing element 49 and the second phase difference element 48.

The diffusion optical element 50 may include a diffusion element that diffuses the blue light BLc made incident thereon and a reflection element that is provided to be separated from the diffusion element and reflects the blue light BLc diffused by the diffusion element.

In other words, the diffusion optical element 50 may include a diffusion element that diffuses incident light and a reflection element that is provided separately from the diffusion element and reflects the incident light. In this case, for example, the diffusion optical element 50 may be configured to diffuse, with a diffusion plate, the blue light BLc made incident from the second condensing element 49, reflect, with a reflection plate, the blue light BLc diffused by the diffusion plate, diffuse, again, with the diffusion plate, the blue light BLc reflected by the reflection plate, and emit the blue light BLc to the second condensing element 49.

When being reflected by the diffusion optical element 50, the blue light BLc changes to circularly polarized light in the opposite direction of a rotating direction of the blue light BLc made incident on the diffusion optical element 50.

Accordingly, the blue light BLc reflected by the diffusion optical element 50 is converted into the p-polarized blue light BLp in a process of passing through the second phase difference element 48. The blue light BLp converted by the second phase difference element 48 is reflected in the +X direction by the emission-position changing element 6A2, transmitted through the light separating and combining element 45 along the illumination optical axis Ax3, and made incident on the third phase difference element 51.

In this embodiment, an optical path length of the blue light made incident on the wavelength conversion element 47 from the light separating and combining element 45 via the emission-position changing element 6A1 and an optical path length of the blue light made incident on the diffusion optical element 50 from the light separating and combining element 45 via the emission-position changing element 6A2 substantially coincide.

In other words, an optical path length of the fluorescent light YL made incident on the light separating and combining element 45 from the wavelength conversion element 47 via the emission-position changing element 6A1 and an optical path length of the blue light made incident on the light separating and combining element 45 from the diffusion optical element 50 via the emission-position changing element 6A2 substantially coincide.

This is to make it easy to, when the fluorescent light YL emitted from the wavelength conversion element 47 and the blue light diffused by the diffusion optical element 50 according to a diffusion angle of the fluorescent light YL in the wavelength conversion element 47 are combined by the light separating and combining element 45, match a light beam diameter of the fluorescent light YL and a light beam diameter of the blue light BLp.

Configuration of the Third Phase Difference Element

The blue light BLp having passed through the light separating and combining element 45 in the +X direction and the fluorescent light YL reflected by the light separating and combining element 45 in the +X direction are made incident on the third phase difference element 51. That is, white light obtained by combining the blue light BLp and the fluorescent light YL in the light separating and combining element 45 is made incident on the third phase difference element 51.

The third phase difference element 51 converts the white light made incident thereon into light in which s-polarized light and p-polarized light are mixed.

That is, the third phase difference element 51 emits white illumination light including the blue light BL including an s-polarized light component and a p-polarized light component and the fluorescent light YL including an s-polarized light component and a p-polarized light component. Such illumination light is made incident on the uniformizing device 31 explained above.

Configuration of the Emission-Position Changing Mechanism

The emission-position changing mechanism 52A changes, under control by the control section 53A, an emission position of light made incident thereon.

Specifically, the emission-position changing mechanism 52A includes an optical element that reflects or refracts light made incident thereon. The emission-position changing mechanism 52A changes an angle of the optical element with respect to an imaginary plane orthogonal to the optical axis of the incident light to thereby change an emission position of the incident light. The emission-position changing mechanism 52A includes two emission-position changing elements 6 (6A1 and 6A2).

Configuration of the Emission-Position Changing Element

Figure 3:
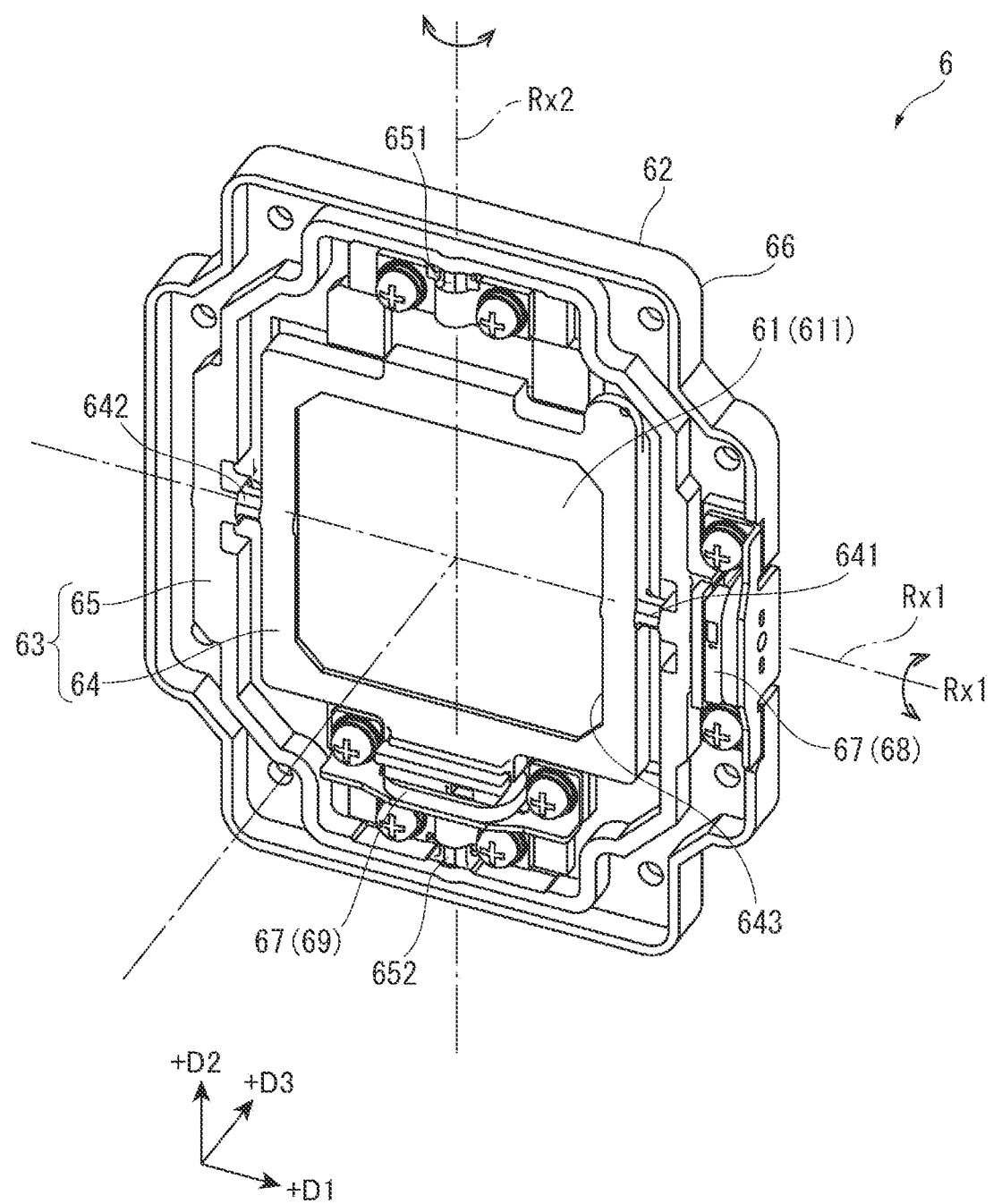
FIG. 3 is a perspective view showing the configuration of an emission-position changing element in the first embodiment.
Figure 4:
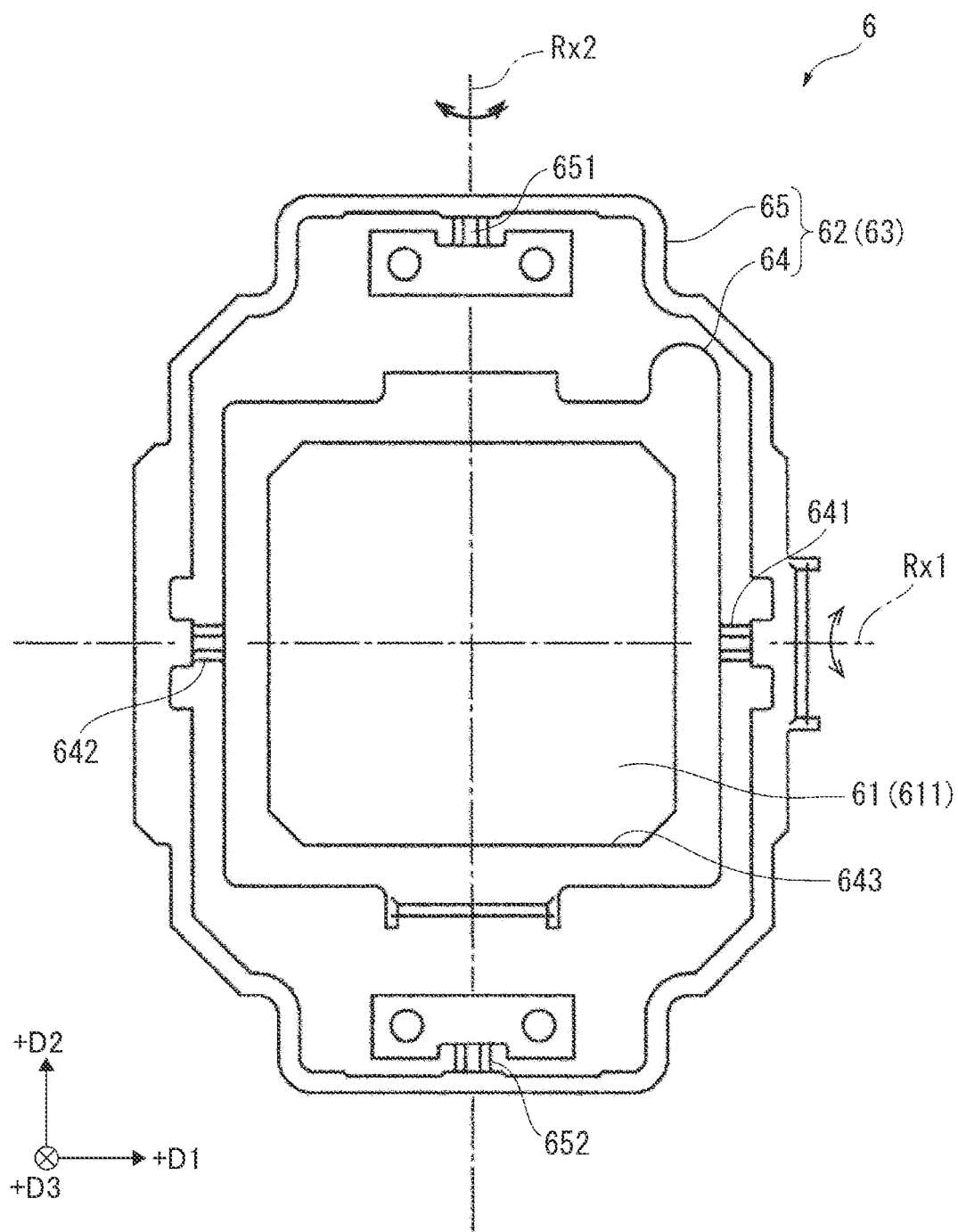
FIG. 4 is a plan view showing the configuration of the emission-position changing element in the first embodiment.

FIG. 3 is a perspective view of the emission-position changing element 6 viewed from a light incident side. FIG. 4 is a plan view of an optical element 61 of the emission-position changing element 6 and a movable section 63 configuring a supporting member 62 viewed from the light incident side.

The emission-position changing element 6 is an optical path shift device that changes an emission direction of light made incident thereon to thereby change an emission position of the light.

In this embodiment, the emission-position changing element 6 changes a reflection direction of light made incident thereon to thereby change an emission direction of the light and change an emission position of the light.

The emission-position changing element 6 includes, as shown in FIGS. 3 and 4, the optical element 61 and the supporting member 62.

In the following explanation, three directions orthogonal to one another in the emission-position changing element 6 are represented as a +D1 direction, a +D2 direction, and a +D3 direction. Among these directions, the +D1 direction and the +D2 direction are directions orthogonal to each other when the emission-position changing element 6 is viewed from the light incident side and the +D3 direction is an incident direction of light on the emission-position changing element 6. The opposite direction of the +D1 direction is represented as a −D1 direction, the opposite direction of the +D2 direction is represented as a −D2 direction, and the opposite direction of the +D3 direction is represented as a −D3 direction.

In this embodiment, the emission-position changing elements 6A1 and 6A2 are disposed such that the +D2 direction is substantially parallel to the +Y direction.

Configuration of the Optical Element

The optical element 61 is a reflection element that includes an incident surface 611 on which light is made incident and reflects substantially all lights made incident on the incident surface 611. The optical element 61 included in the emission-position changing element 6A1 is equivalent to a first reflection optical element. The optical element 61 included in the emission-position changing element 6A2 is equivalent to the second reflection optical element. The optical element 61 is displaced by the supporting member 62, whereby an incident angle of light with respect to the incident surface 611 is changed and a reflection direction of the light and an emission position of the light are changed.

The emission-position changing element 6 including such a reflection element as the optical element 61 is a reflection-type optical path shift device that reflects light made incident thereon and changes an emission position of the light.

Configuration of the Supporting Member

The supporting member 62 supports the optical element 61. Specifically, the supporting member 62 supports the optical element 61 to be capable of turning centering on each of two axes orthogonal to each other. The supporting member 62 includes the movable section 63, a fixed frame body 66, and a driving element 67.

Configuration of the Movable Section

The movable section 63 is displaced by the driving element 67. The movable section 63 includes a first frame body 64 and a second frame body 65.

The first frame body 64 holds the optical element 61. The first frame body 64 includes a shaft section 641 projecting in the +D1 direction from an end portion in the +D1 direction, a shaft section 642 projecting in the −D1 direction from an end portion in the −D1 direction, and an opening section 643 that makes light incident on the optical element 61. The shaft sections 641 and 642 are coupled to the second frame body 65 and form a turning axis Rx1 of the first frame body 64 extending along the +D1 direction.

The second frame body 65 is a frame-like member surrounding the first frame body 64. The second frame body 65 includes a shaft section 651 projecting in the +D2 direction from an end portion in the +D2 direction and a shaft section 652 projecting in the −D2 direction from an end portion in the −D2 direction.

The shaft sections 651 and 652 are coupled to the fixed frame body 66 and form a turning axis Rx2 of the first frame body 64 and the second frame body 65 extending along the +D2 direction.

Configuration of the Fixed Frame Body

As shown in FIG. 3, the fixed frame body 66 is fixed in the housing for light source CA and supports the movable section 63 to be capable of turning centering on the turning axes Rx1 and Rx2. Specifically, the fixed frame body 66 supports the movable section 63 to be capable of turning centering on the turning axis Rx1 and supports the movable section 63 to be capable of turning centering on the turning axis Rx2.

Configuration of the Driving Element

The driving element 67 includes a first driving element 68 that turns the movable section 63 centering on the turning axis Rx1 and a second driving element 69 that turns the movable section 63 centering on the turning axis Rx2.

Although not shown in detail, the first driving element 68 is a magnetic driving mechanism including a magnet, a magnetism holding plate, a coil, and a coil holding plate. The second driving element 69 is the same magnetic driving mechanism.

The first driving element 68 and the second driving element 69 may include components other than the magnetic driving mechanism, for example, a motor and a transmission mechanism such as a gear.

Changes of an Emission Position of Excitation Light and an Emission Position of Fluorescent Light by the Emission-Position Changing Element The emission-position changing element 6A1 of the two emission-position changing elements 6 is equivalent to a first emission-position changing element. As shown in FIG. 2, the emission-position changing element 6A1 is provided on an optical path between the light separating and combining element 45 and the wavelength conversion element 47. The emission-position changing element 6A1 changes an incident position in the wavelength conversion element 47 of the blue light BLp made incident from the light separating and combining element 45.

The emission-position changing element 6A1 changes an emission position to the light separating and combining element 45 of the fluorescent light YL made incident from the wavelength conversion element 47 via the first condensing element 46 to thereby change an emission position of the fluorescent light YL emitted from the light separating and combining element 45 to the outside of the light source device 4A.

As explained above, the blue light BLp made incident from the light separating and combining element 45 is equivalent to excitation light and the fluorescent light YL is equivalent to converted light.

Figure 5:
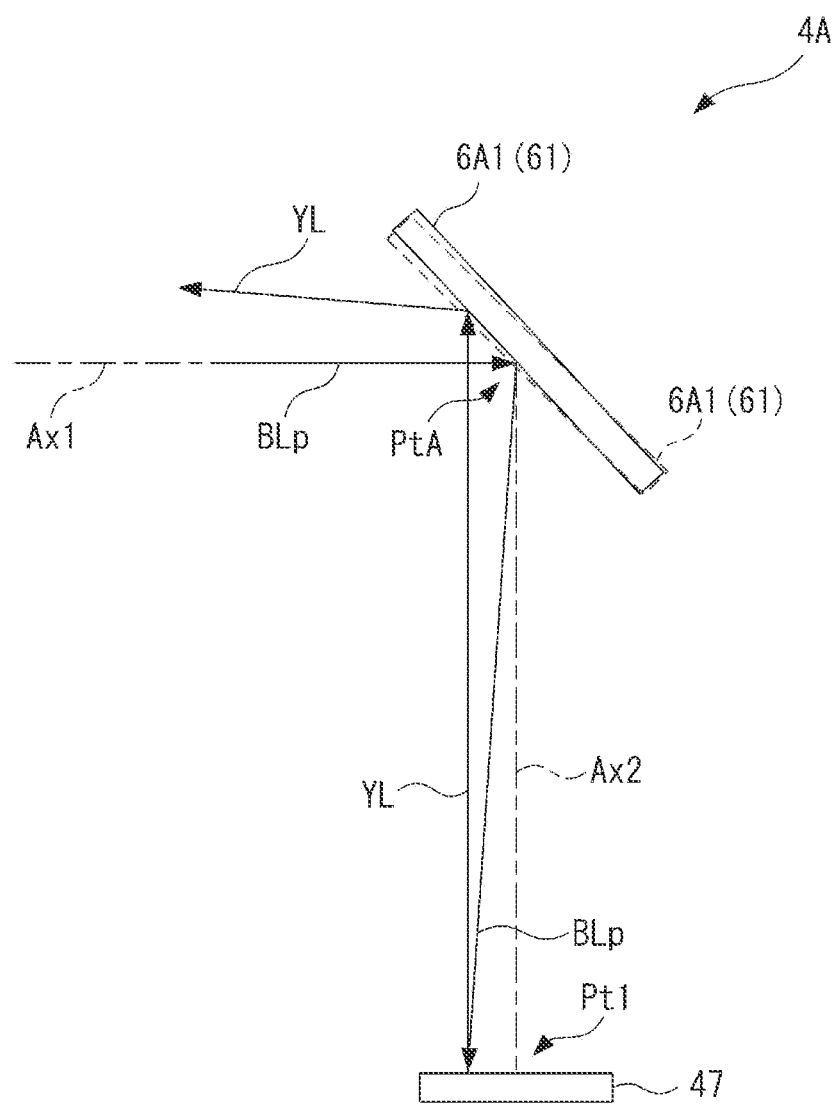
FIG. 5 is a diagram for explaining that an emission position of excitation light and an emission position of converted light are changed by the emission-position changing element in the first embodiment.
Figure 6:
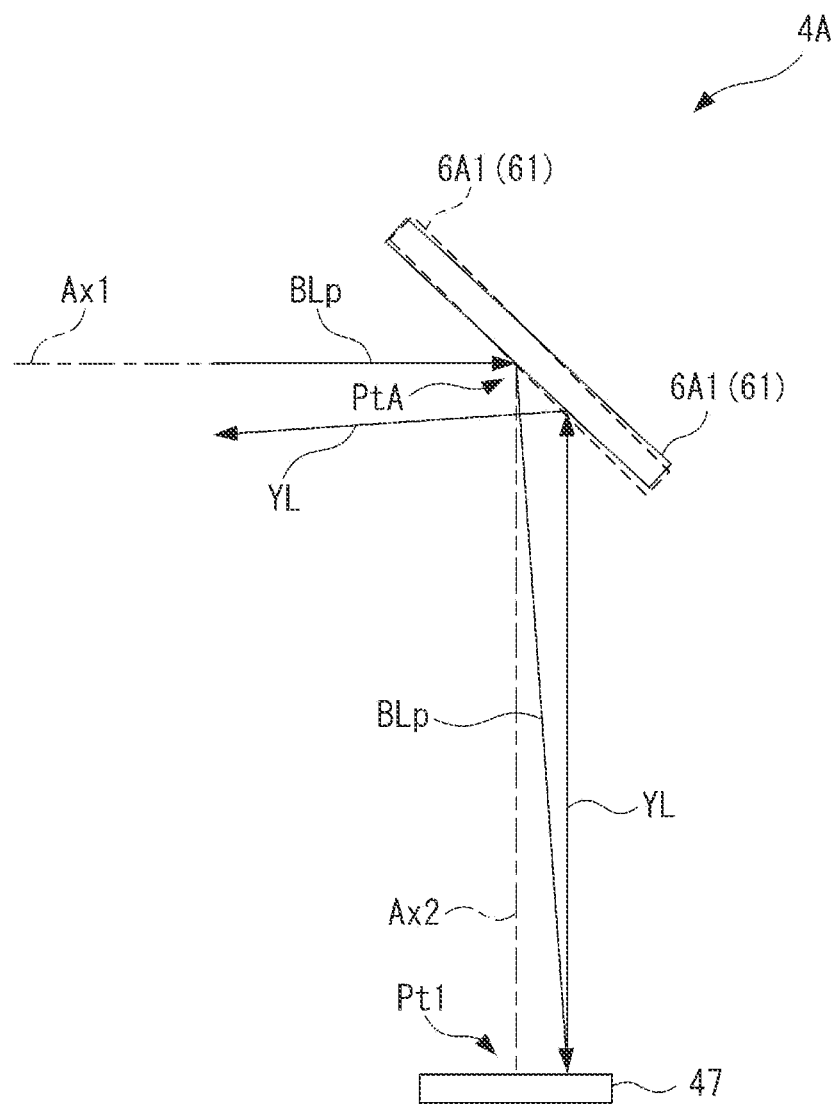
FIG. 6 is a diagram for explaining that the emission position of the excitation light and an emission position of diffused light are changed by the emission-position changing element in the first embodiment.

FIGS. 5 and 6 are diagrams for explaining that an emission position of the blue light (the excitation light) and an emission position of the fluorescent light (the converted light) are changed by the emission-position changing element 6A1. In FIGS. 5 and 6, illustration of the first condensing element 46 is omitted. Besides, refraction by the first condensing element 46 of rays shown in FIGS. 5 and 6 is omitted.

For example, as shown in FIGS. 5 and 6, the emission-position changing element 6A1 displaces the optical element 61 with the driving element 67 to thereby change an emission direction and an emission position of the blue light BLp made incident from the light separating and combining mechanism 45 to change an incident position of the blue light BLs in the wavelength conversion element 47 and change an emission direction and an emission position of the fluorescent light YL to the light separating and combining element 45.

Specifically, as shown in FIG. 5, the optical element 61 of the emission-position changing element 6A1 can be disposed in a position turned clockwise viewed from the +Y direction by the driving element 67 of the emission-position changing element 6A1 from a reference position (the position of the optical element 61 indicated by a dotted line in FIG. 5) inclined 45° with respect to each of an imaginary plane orthogonal to the illumination optical axis Ax1 and an imaginary plane orthogonal to the illumination optical axis Ax2.

In this case, a principal ray of the blue light BLp made incident on the optical element 61 along the illumination optical axis Ax1 is reflected in the −Z direction with respect to the illumination optical axis Ax2 by the optical element 61 and made incident on a position further in the −Z direction than a position Pt1 corresponding to the illumination optical axis Ax2 in the wavelength conversion element 47.

When the principal ray of the blue light BLp is made incident on such a position, a principal ray of the fluorescent light YL emitted from the wavelength conversion element 47 is made incident on a position further in the −Z direction than a position PtA corresponding to the illumination optical axes Ax1 and Ax2 in the optical element 61.

Accordingly, the principal ray of the fluorescent light YL made incident on the optical element 61 is reflected by the optical element 61 and emitted in the +X direction with respect to the illumination optical axis Ax1.

On the other hand, as shown in FIG. 6, the optical element 61 of the emission-position changing element 6A1 can be disposed in a position turned counterclockwise viewed from the +Y direction by the driving element 67 of the emission-position changing element 6A1 from the reference position (the position of the optical element 61 indicated by a dotted line in FIG. 6).

In this case, the principal ray of the blue light BLp made incident on the optical element 61 along the illumination optical axis Ax1 is reflected in the +Z direction with respect to the illumination optical axis Ax2 by the optical element 61 and made incident on a position further in the −Z direction than the position Pt1 in the wavelength conversion element 47.

When the principal ray of the blue light BLp is made incident on such a position, the principal ray of the fluorescent light YL emitted from the wavelength conversion element 47 is made incident on a position further in the +Z direction than the position PtA in the optical element 61.

Accordingly, the principal ray of the fluorescent light YL made incident on the optical element 61 is reflected by the optical element 61 and emitted in the −X direction with respect to the illumination optical axis Ax1.

The fluorescent light YL reflected by the optical element 61 of the emission-position changing element 6A1 is reflected in the +X direction by the light separating and combining element 45 and emitted to the outside of the light source device 4A via the third phase difference element 51.

As explained above, the optical element 61 is displaced by the driving element 67, whereby an emission position of the fluorescent light YL from the optical element 61 to the light separating and combining element 45, that is, an incident position of the fluorescent light YL in the light separating and combining element 45 changes.

In this way, an emission position and an emission direction of the fluorescent light YL emitted from the light source device 4A are changed by the emission-position changing mechanism 52A including the emission-position changing element 6A1.

Changes of an Emission Position of Light to be Diffused and an Emission Position of Diffused Light by the Emission-Position Changing Element The emission-position changing element 6A2 of the two emission-position changing elements 6 is equivalent to a second emission-position changing element. As shown in FIG. 2, the emission-position changing element 6A2 is provided on an optical path between the light separating and combining element 45 and the diffusion optical element 50. The emission-position changing element 6A2 changes an emission direction of the blue light BLs made incident from the light separating and combining element 45 to thereby change an incident position of the blue light in the diffusion optical element 50.

The emission-position changing element 6A2 changes an emission direction of the blue light BLp made incident from the diffusion optical element 50 via the second condensing element 49 and the second phase difference element 48 and changes an emission position of the blue light BLp to the light separating and combining element 45 to thereby change an emission position of the blue light BL emitted from the light separating and combining element 45 to the outside of the light source device 4A.

As explained above, the blue light separated by the light separating and combining element 45 and made incident on the diffusion optical element 50 is equivalent to light to be diffused and the blue light emitted from the diffusion optical element 50 and made incident on the light separating and combining element 45 is equivalent to diffused light.

Figure 7:
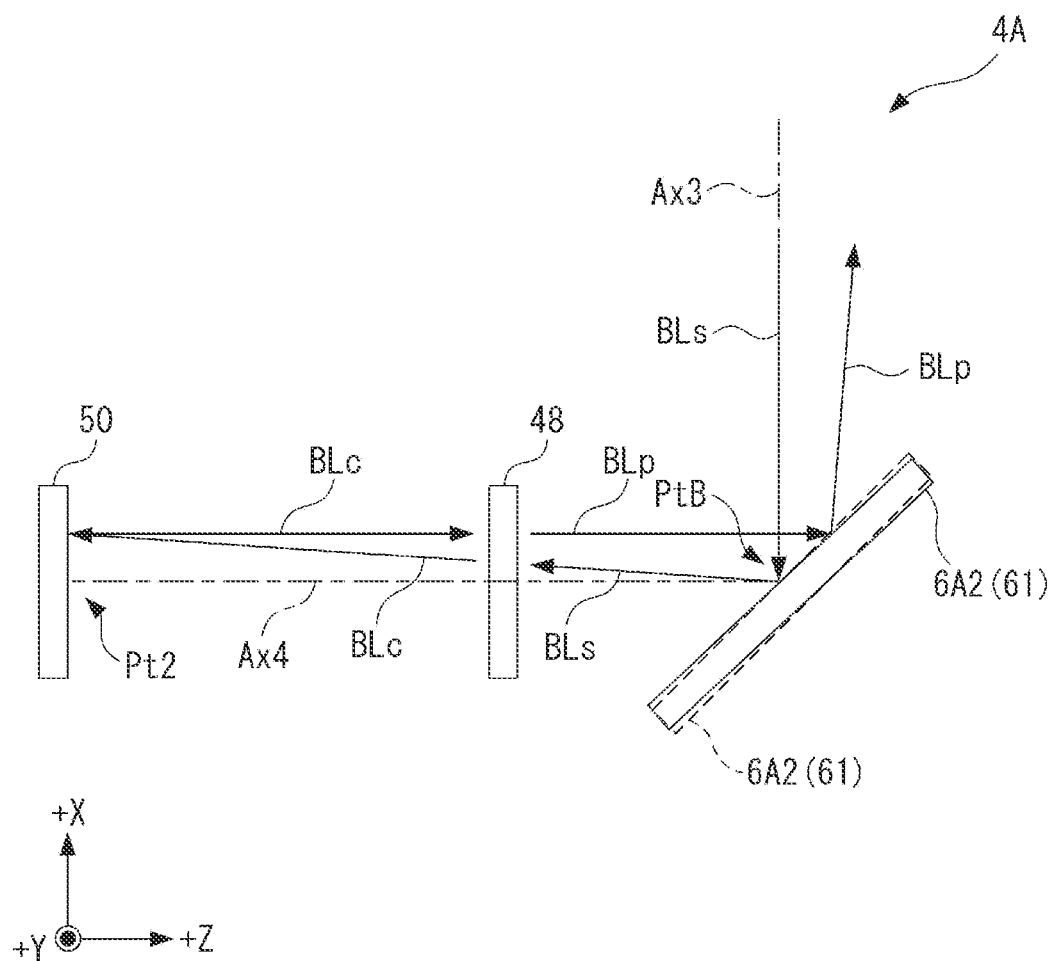
FIG. 7 is a diagram for explaining that an emission position of light to be diffused and the emission position of the diffused light are changed by the emission-position changing element in the first embodiment.
Figure 8:
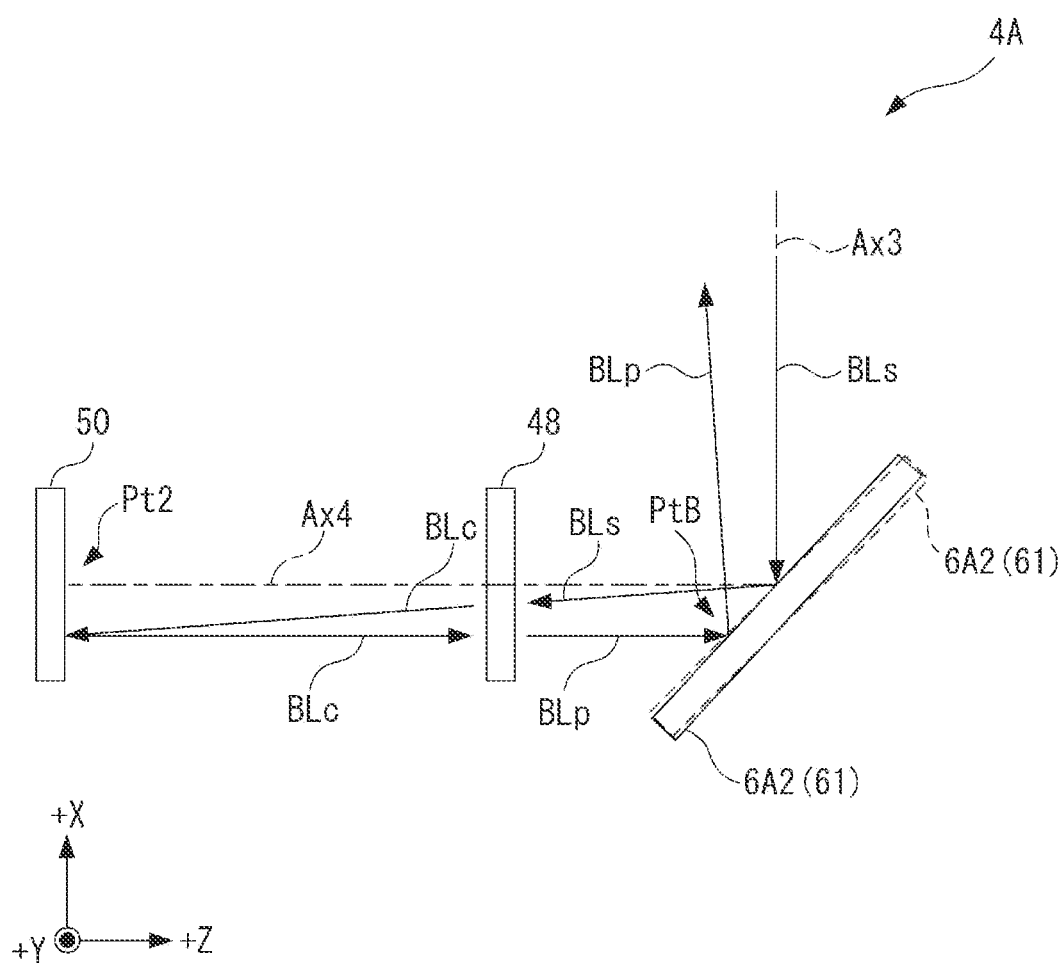
FIG. 8 is a diagram for explaining that the emission position of the light to be diffused and the emission position of the diffused light are changed by the emission-position changing element in the first embodiment.

FIGS. 7 and 8 are diagrams for explaining that an emission position of the blue light (the light to be diffused) and an emission position of the blue light (the diffused light) are moved by the emission-position changing element 6A2. In FIGS. 7 and 8, illustration of the second condensing element 49 is omitted. Besides, refraction by the second condensing element 49 of rays shown in FIGS. 7 and 8 is omitted.

For example, as shown in FIGS. 7 and 8, the emission-position changing element 6A2 displaces the optical element 61 with the driving element 67 to thereby change an emission position of the blue light BLs made incident from the light separating and combining element 45 and change an incident position of the blue light BLc in the diffusion optical element 50. Besides, the emission-position changing element 6A2 changes an emission position of the blue light BLp to the light separating and combining element 45.

Specifically, as shown in FIG. 7, the optical element 61 of the emission-position changing element 6A2 can be disposed in a position turned clockwise viewed from the +Y direction by the driving element 67 of the emission-position changing element 6A2 from a reference position (the position of the optical element 61 indicated by a dotted line in FIG. 7) inclined 45° with respect to each of the imaginary plane orthogonal to the illumination optical axis Ax1 and the imaginary plane orthogonal to the illumination optical axis Ax2. In this case, a principal ray of the blue light BLs made incident on the optical element 61 along the illumination optical axis Ax3 is reflected in the +X direction with respect to the illumination optical axis Ax4 by the optical element 61.

The principal ray of the blue light BLc converted by the second phase difference element 48 is made incident on a position further in the +X direction than a position Pt2 corresponding to the illumination optical axis Ax4 in the diffusion optical element 50.

When the principal ray of the blue light BLc is made incident on such a position, the principal ray of the blue light BLp emitted from the diffusion optical element 50 and converted by the second phase difference element 48 is made incident on a position further in the +X direction than a position PtB corresponding to the illumination optical axes Ax3 and Ax4 in the optical element 61.

Accordingly, the principal ray of the blue light BLp made incident on the optical element 61 is reflected by the optical element 61 and emitted in the +Z direction with respect to the illumination optical axis Ax2.

On the other hand, as shown in FIG. 8, the optical element 61 of the emission-position changing element 6A2 can be disposed in a position turned counterclockwise viewed from the +Y direction by the driving element 67 of the emission-position changing element 6A2 from the reference position (the position of the optical element 61 indicated by a dotted line in FIG. 8).

In this case, the principal ray of the blue light BLs made incident on the optical element 61 along the illumination optical axis Ax2 is reflected in the −X direction with respect to the illumination optical axis Ax4 by the optical element 61. The principal ray of the blue light BLc converted by the second phase difference element 48 is made incident on a position further in the −X direction than the position Pt2 in the diffusion optical element 50.

When the principal ray of the blue light BLc is made incident on such a position, the principal ray of the blue light BLp emitted from the diffusion optical element 50 and converted by the second phase difference element 48 is made incident on a position further in the −X direction than the position PtB in the optical element 61.

Accordingly, the principal ray of the blue light BLp made incident on the optical element 61 is reflected by the optical element 61 and emitted in the −Z direction with respect to the illumination optical axis Ax2.

The blue light BLp reflected by the optical element 61 of the emission-position changing element 6A2 passes through the light separating and combining element 45 in the +X direction and is emitted to the outside of the light source device 4A via the third phase difference element 51.

As explained above, the optical element 61 is displaced by the driving element 67, whereby an emission position of the blue light BLp from the optical element 61 to the light separating and combining element 45, that is, an incident position of the blue light BLp in the light separating and combining element 45 changes.

In this way, an emission position and an emission direction of the blue light BLp emitted from the light source device 4A are changed by the emission-position changing mechanism 52A including the emission-position changing element 6A2.

The emission-position changing mechanism 52A changes, under the control by the control section 53A, with the emission-position changing elements 6A1 and 6A2, an emission position of the blue light BLp from the light source device 4A and an emission position of the fluorescent light YL from the light source device 4A in the same direction in synchronization with each other.

Configuration of the Control Section

The control section 53A shown in FIG. 1 includes an arithmetic processing circuit such as a CPU (Central Processing Unit) and a storage circuit such as a memory and controls the operation of the light source device 4A under control by the control device. For example, the control section 53A controls lighting of the first light source 41.

For example, the control section 53A controls the operation of the emission-position changing mechanism 52A according to incidence of the blue light BLp on the wavelength conversion element 47. In other words, when the first light source 41 is lit, the control section 53A causes the emission-position changing mechanism 52A to operate.

At this time, the control section 53A controls the operation of the emission-position changing elements 6A1 and 6A2 and changes an emission position of the blue light BLp (the diffused light) to the light separating and combining element 45 and an emission position of the fluorescent light YL (the converted light) to the light separating and combining element 45 in synchronization with each other.

That is, the control section 53A changes an emission position of the fluorescent light YL from the light source device 4A and an emission position of the blue light BL from the light source device 4A in synchronization with each other.

Specifically, the control section 53A synchronizes the operations of the emission-position changing elements 6A1 and 6A2 and matches the emission position of the fluorescent light YL and the emission position of the blue light BL from the light source device 4A. That is, the emission-position changing elements 6A1 and 6A2 change, under the control by the control section 53A, the emission position of the fluorescent light YL and the emission position of the blue light BL in the same direction at the same speed on an imaginary plane orthogonal to an emission optical axis of the light source device 4A to thereby match the optical axis of the fluorescent light YL and the optical axis of the blue light BL emitted from the light source device 4A.

The emission optical axis of the light source device 4A coincides with the illumination optical axes Ax and Ax3.

Figure 9:
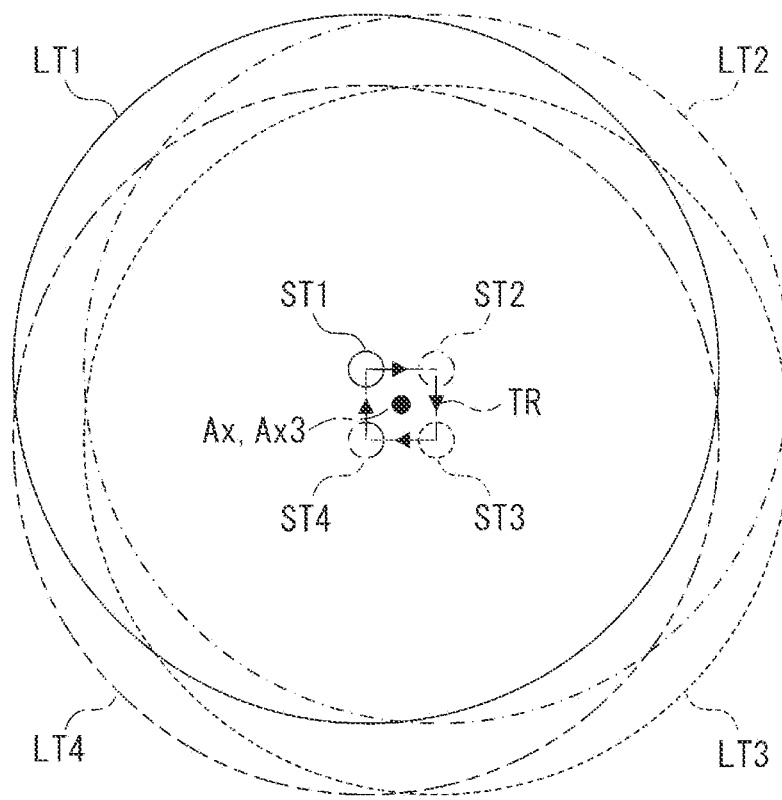
FIG. 9 is a diagram schematically showing an example of a change of an emission position of fluorescent light and an emission position of blue light from the light source device in the first embodiment.

FIG. 9 is a diagram schematically showing an example of a change of the emission position of the fluorescent light YL and the emission position of the blue light BL from the light source device 4A.

In this embodiment, as shown in FIG. 9, in a state in which the optical axis of the fluorescent light YL and the optical axis of the blue light BL, which is the first color light, emitted from the light source device 4A are matched in a predetermined position on an imaginary plane orthogonal to the illumination optical axis Ax, the emission-position changing mechanism 52A causes the emission-position changing elements 6A1 and 6A2 to operate such that a track TR of the optical axis of each of the fluorescent light YL and the blue light BL draws a rectangular shape.

That is, the emission-position changing elements 6A1 and 6A2 change the emission position of the fluorescent light YL emitted from the light source device 4A and the emission position of the blue light BL emitted from the light source device 4A in the same direction at the same speed such that the emission position of the fluorescent light YL and the emission position of the blue light BL draw the same track.

Specifically, the emission-position changing elements 6A1 and 6A2 move the emission position of the fluorescent light YL emitted from the light source device 4A and the emission position of the blue light BL emitted from the light source device 4A in the same cycle, at the same speed, and in the same direction such that a track drawn by the emission position of the fluorescent light YL and a track drawn by the emission position of the blue light BL coincide.

Accordingly, at certain timing, the optical axis of the fluorescent light YL and the optical axis of the blue light BL coincide in a position ST1 on the rectangular track TR. At another timing, the optical axis of the fluorescent light YL and the optical axis of the blue light BL coincide in a position ST2 on the track TR.

At another timing, the optical axis of the fluorescent light YL and the optical axis of the blue light BL coincide in a position ST3 on the track TR. At still another timing, the optical axis of the fluorescent light YL and the optical axis of the blue light BL coincide in a position ST4 on the track TR.

Since the optical axis of the fluorescent light YL and the optical axis of the blue light BL emitted from the light source device 4A coincide in this way, illuminance unevenness less easily occurs in white illumination light including the fluorescent light YL and the blue light BL and emitted from the light source device 4A.

For example, color unevenness less easily occurs in illumination light LT1 at the time when the optical axis of the fluorescent light YL and the optical axis of the blue light BL coincide in the position ST1. Similarly, color unevenness less easily occurs in illumination lights LT2, LT3, and LT4 at the time when the optical axis of the fluorescent light YL and the optical axis of the blue light BL coincide in positions ST2, ST3, and ST4.

The image emission device 34 forms image lights using illumination light emitted from such a light source device 4A, whereby color unevenness is suppressed from occurring in image light projected by the projection optical device 36.

The track TR drawn by the optical axis of the fluorescent light YL and the optical axis of the blue light BL is not limited to the rectangular track shown in FIG. 9 and may be a circular shape or may be a Lissajous figure.

Effects of the First Embodiment

The projector 1A according to this embodiment explained above achieves the following effects.

The projector 1A according to this embodiment includes the light source device 4A, the image emission device 34 that modulates light emitted from the light source device 4A and emits the modulated light as image light, and the projection optical device 36 that projects the image light emitted from the image emission device 34.

The light source device 4A includes the first light source 41, the wavelength conversion element 47, and the emission-position changing mechanism 52A. The first light source 41 emits the blue light, which is the first color light. The wavelength conversion element 47 converts a wavelength of the blue light made incident thereon and emits fluorescent light having a wavelength longer than the wavelength of the blue light. The blue light made incident on the wavelength conversion element 47 is equivalent to the excitation light. The fluorescent light emitted from the wavelength conversion element 47 is equivalent to the converted light. The emission-position changing mechanism 52A changes an emission position of the blue light made incident thereon to thereby change an incident position of the blue light on the wavelength conversion element 47.

The emission-position changing mechanism 52A changes the emission position of the blue light BL emitted from the light source device 4A and the emission position of the fluorescent light YL emitted from the light source device 4A in synchronization with each other in the same direction.

With such a configuration, since the emission-position changing mechanism 52A changes the incident position of the blue light on the wavelength conversion element 47, it is possible to prevent the blue light from being continuously made incident on a part of the wavelength conversion element 47.

Consequently, it is possible to prevent temperature from locally rising in the wavelength conversion element 47 to deteriorate the wavelength conversion element 47. Besides, it is possible to prevent wavelength conversion efficiency of the wavelength conversion element 47 from falling.

The emission-position changing mechanism 52A changes the emission position of the blue light BL emitted from the light source device 4A and the emission position of the fluorescent light YL emitted from the light source device 4A in the same direction.

Consequently, it is possible to make it easy to match the optical axis of the blue light BL and the optical axis of the fluorescent light YL emitted from the light source device 4A.

Therefore, it is possible to prevent color unevenness from occurring in illumination light obtained by combining the blue light BL and the fluorescent light YL. It is possible to prevent color unevenness from occurring in an image projected from the projector 1A including such a light source device 4A.

The light source device 4A includes the light separating and combining element 45 and the diffusion optical element 50. The light separating and combining element 45 emits, as excitation light, the blue light BLp of the blue lights BLp and BLs emitted from the first light source 41 and emits the blue light BLs as light to be diffused. The blue light BLp is equivalent to a part of the first color light and the blue light BLs is equivalent to the remaining first color light. The diffusion optical element 50 diffuses the light to be diffused emitted from the light separating and combining element 45 and emits the light to be diffused as diffused light. The light separating and combining element 45 combines the fluorescent light YL (the converted light) made incident from the wavelength conversion element 47 and the blue light BLp (the diffused light) made incident from the diffusion optical element 50. The emission-position changing mechanism 52A changes an emission position of the fluorescent light YL emitted from the light separating and combining element 45 and an emission position of the blue light BLp emitted from the diffusion optical element 50 in the same direction in synchronization with each other.

With such a configuration, it is unnecessary to separately provide a light source that emits the excitation light and a light source that emits the light to be diffused.

The light separating and combining element 45 not only separates the blue lights BLp and BLs into the blue light BLp (the excitation light) and the blue light BLs (the light to be diffused) but also combines the fluorescent light YL (the converted light) emitted from the wavelength conversion element 47 and the blue light (the diffused light) emitted from the diffusion optical element 50.

Consequently, compared with when a light separating element that separates the blue light into the excitation light and the light to be diffused and a light combining element that combines the converted light and the diffused light are separately provided, the configuration of the light source device 4A can be simplified. Besides, a reduction in the size of the light source device 4A can be achieved.

The incident position of the fluorescent light YL and the incident position of the blue light BLp in the light separating and combining element 45 are changed by the emission-position changing mechanism 52A in the same direction in synchronization with each other.

Consequently, the emission position of the fluorescent light YL and the emission position of the blue light BL emitted from the light source device 4A via the light separating and combining element 45 can be changed in the same direction in synchronization with each other.

Therefore, the optical axis of the fluorescent light YL and the optical axis of the blue light BL can be easily matched on the outside of the light source device 4A. It is possible to prevent color unevenness from occurring in illumination light obtained by combining the fluorescent light YL and the blue light BL.

In the light source device 4A, the emission-position changing mechanism 52A includes the emission-position changing elements 6A1 and 6A2. The emission-position changing element 6A1 is equivalent to the first emission-position changing element. The emission-position changing element 6A1 is provided on an optical path between the light separating and combining element 45 and the wavelength conversion element 47. The emission-position changing element 6A1 changes an incident position of the excitation light in the wavelength conversion element 47 and an emission position to the light separating and combining element 45 of the fluorescent light YL, which is the converted light made incident from the wavelength conversion element 47. The emission-position changing element 6A2 is equivalent to the second emission-position changing element. The emission-position changing element 6A2 is provided on an optical path between the light separating and combining element 45 and the diffusion optical element 50. The emission-position changing element 6A2 changes an emission position to the light separating and combining element 45 of the diffused light made incident from the diffusion optical element 50. The emission-position changing mechanism 52A changes, with the emission-position changing elements 6A1 and 6A2, an emission position of the blue light BL (the diffused light) from the light separating and combining element 45 and an emission position of the fluorescent light YL (the converted light) from the light separating and combining element 45 in the same direction in synchronization with each other.

With such a configuration, the emission-position changing element 6A1 can change the emission position of the fluorescent light YL from the light separating and combining element 45 by changing the emission position of the fluorescent light YL to the light separating and combining element 45. The emission-position changing element 6A2 can change the emission position of the blue light BL from the light separating and combining element 45 by changing the emission position of the blue light BLp to the light separating and combining element 45.

In this way, the emission-position changing elements 6A1 and 6A2 can make it easy to change the emission position of the fluorescent light YL and the emission position of the blue light BLp from the light separating and combining element 45 in the same direction in synchronization with each other by operating in synchronization with each other.

In the light source device 4A, the emission-position changing element 6A1 reflects, toward the wavelength conversion element 47, the blue light BLp (the excitation light) emitted from the light separating and combining element 45 and reflects, toward the light separating and combining element 45, the fluorescent light YL (the converted light) emitted from the wavelength conversion element 47. The emission-position changing element 6A2 reflects, toward the diffusion optical element 50, the blue light BLs (the light to be diffused) emitted from the light separating and combining element 45 and reflects, toward the light separating and combining element 45, the blue light BLp (the diffused light) emitted from the diffusion optical element 50.

With such a configuration, a change of the incident position of the blue light BLp in the wavelength conversion element 47 and a change of the emission position of the fluorescent light YL to the light separating and combining element 45 can be simultaneously carried out by the emission-position changing element 6A1.

Similarly, a change of the incident position of the blue light in the diffusion optical element 50 and a change of the emission position of the blue light BLp to the light separating and combining element 45 can be simultaneously carried out by the emission-position changing element 6A2.

Therefore, it is possible to prevent the configuration of the light source device 4A from being complicated.

In the light source device 4A, at least one emission-position changing element of the emission-position changing elements 6A1 and 6A2 is an optical path shift device that changes an emission position of light made incident thereon.

In this embodiment, each of the emission-position changing elements 6A1 and 6A2 is an optical path shift device. Each of the emission-position changing element 6A1 and 6A2, which are optical path shift devices, includes the optical element 61 including the incident surface 611 on which light is made incident and the driving element 67. The driving element 67 turns the optical element 61 centering on a turning axis extending along at least one direction of two directions included in the incident surface 611 and orthogonal to each other.

In this embodiment, the optical element 61 is the reflection element. The driving element 67 includes the first driving element 68 that turns the optical element 61 centering on the turning axis Rx1 extending along the +D1 direction included in the incident surface 611 and the second driving element 69 that turns the optical element 61 centering on the turning axis Rx2 extending along the +D2 direction included in the incident surface 611 and orthogonal to the +D1 direction.

With such a configuration, by displacing the optical element 61 with the driving element 67, it is possible to change an emission position of light made incident on the optical element 61.

The emission-position changing elements 6A1 and 6A2 having the functions explained above can be configured by such an optical path shift device.

In the light source device 4A, the emission-position changing mechanism 52A changes the emission position of the blue light BL from the light source device 4A and the emission position of the fluorescent light YL from the light source device 4A in synchronization with each other such that the optical axis of the blue light BL (the first color light) emitted from the light source device 4A and the optical axis of the fluorescent light YL (the converted light) emitted from the light source device 4A substantially coincide.

With such a configuration, illumination light emitted from the light source device 4A is light obtained by combining the blue light BL and the fluorescent light YL such that the optical path of the blue light BL and the optical path of the fluorescent light YL coincide.

Consequently, it is possible to effectively prevent color unevenness from occurring in the illumination light emitted from the light source device 4A. Consequently, it is possible to effectively prevent color unevenness from occurring in an image projected from the projector 1A.

The light source device 4A causes the emission-position changing mechanism 52A to operate according to incidence of the blue light BLp (the excitation light) on the wavelength conversion element 47. That is, the light source device 4A in this embodiment causes the emission-position changing mechanism 52A to operate according to lighting of the first light source 41.

With such a configuration, since the emission-position changing mechanism 52A operates while the blue light BLp is made incident on the wavelength conversion element 47, an incident position of the blue light BLp in the wavelength conversion element 47 can be changed.

Therefore, it is possible to prevent deterioration of the wavelength conversion element 47. Besides, it is possible to prevent wavelength conversion efficiency of the wavelength conversion element 47 from falling.

Second Embodiment

A second embodiment of the present disclosure is explained below.

A projector according to this embodiment includes the same configuration as the configuration of the projector 1A according to the first embodiment. However, the configuration of a control section that controls the operation of an emission-position changing mechanism is different. In the following explanation, the same or substantially the same portions as the portions explained above are denoted by the same reference numerals and signs and explanation of the portions is omitted.

Figure 10:
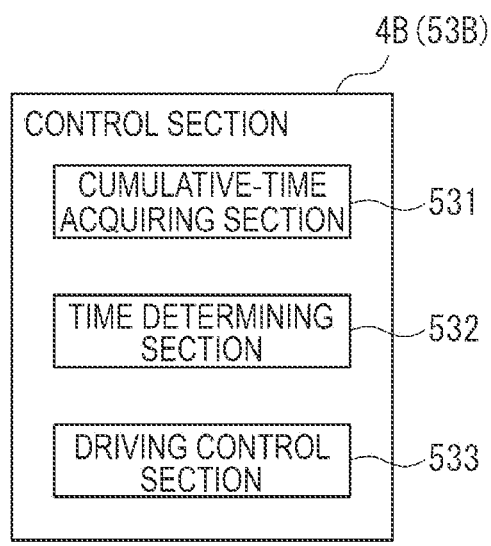
FIG. 10 is a block diagram showing the configuration of a control section included in a light source device included in a projector in a second embodiment.

FIG. 10 is a block diagram showing the configuration of a control section 53B included in a light source device 4B of the projector according to this embodiment.

The projector according to this embodiment includes the light source device 4B instead of the light source device 4A according to the first embodiment. The light source device 4B includes the same components and the same functions as the components and the functions of the light source device 4A except that the light source device 4B includes the control section 53B shown in FIG. 10 instead of the control section 53A.

Configuration of the Control Section

Like the control section 53A, the control section 53B controls the operation of the light source device 4B. For example, the control section 53B controls the operation of the emission-position changing mechanism 52A. The control section 53B includes a cumulative-time acquiring section 531, a time determining section 532, and a driving control section 533.

The cumulative-time acquiring section 531 acquires a cumulative incident time of the blue light BLp (the excitation light) on the wavelength conversion element 47. In other words, the cumulative-time acquiring section 531 clocks a cumulative incident time, which is a cumulative time in which the blue light BLp is made incident on the wavelength conversion element 47.

The time determining section 532 determines whether the cumulative incident time acquired by the cumulative-time acquiring section 531 is equal to or longer than a predetermined time. The predetermined time may be set when the projector is shipped or may be set by a user.

The driving control section 533 controls the operation of the emission-position changing mechanism 52A based on a determination result by the time determining section 532.

Specifically, when the time determining section 532 determines that the cumulative incident time is not equal to or longer than the predetermined time, the driving control section 533 does not cause the emission-position changing mechanism 52A to operate. In this case, an incident position of the blue light BLp in the wavelength conversion element 47 is not changed. An emission position of the blue light BL and an emission position of the fluorescent light YL from the light source device 4B are not changed either.

On the other hand, when the time determining section 532 determines that the cumulative incident time is equal to or longer than the predetermined time, the driving control section 533 causes the emission-position changing mechanism 52A to operate and changes the incident position of the blue light BLp on the wavelength conversion element 47. Besides, the driving control section 533 changes the emission position of the fluorescent light YL emitted from the light source device 4B and the emission position of the blue light BL emitted from the light source device 4B in synchronization with each other.

When it is determined that the cumulative incident time is equal to or longer than the predetermined time, the driving control section 533 may increase, for example, a light amount of the blue light emitted from the first light source 41 or may increase, for example, a ratio of the blue light BLp to the blue light emitted from the first phase difference element 43.

Consequently, it is possible to increase a light amount of the fluorescent light YL emitted from the wavelength conversion element 47, wavelength conversion efficiency of which falls. Besides, it is possible to adjust a balance between the fluorescent light YL and the blue light BL in illumination light emitted from the light source device 4B.

Accordingly, it is possible to prevent a light amount of the illumination light from decreasing in a state in which a balance between a light amount of the fluorescent light YL and a light amount of the blue light BL in the illumination light emitted from the light source device 4B is maintained.

Effects of the Second Embodiment

The projector according to this embodiment explained above can achieve the same effects as the effects of the projector 1A according to the first embodiment. Besides, the projector can achieve the following effects.

The light source device 4B operates the emission-position changing mechanism 52A according to the cumulative incident time of the blue light BLp (the excitation light) on the wavelength conversion element 47.

Even in a state in which the incident position of the blue light BLp in the wavelength conversion element 47 does not change, when the cumulative incident time of the blue light BLp on the wavelength conversion element 47 is not equal to or longer than the predetermined time, it is conceivable that deterioration of the wavelength conversion element 47 has not worsened.

In this case, by not causing the emission-position changing mechanism 52A to operate, electric power and control for causing the emission-position changing mechanism 52A to operate are made unnecessary.

On the other hand, when the cumulative incident time is equal to or longer than the predetermined time, it is conceivable that the deterioration of the wavelength conversion element 47 has worsened, the wavelength conversion efficiency in the wavelength conversion element 47 has fallen, and a light amount of fluorescent light emitted from the wavelength conversion element 47 has decreased.

In this case, the light source device 4B causes, with the control section 53B, the emission-position changing mechanism 52A to operate and changes the incident position of the blue light BLp in the wavelength conversion element 47.

Consequently, it is possible to prevent worsening of the deterioration in the wavelength conversion element 47 and the fall of the wavelength conversion efficiency in the wavelength conversion element 47.

Third Embodiment

A third embodiment of the present disclosure is explained below.

A projector according to this embodiment includes the same configuration as the configuration of the projector 1A according to the first embodiment. However, a target of displacement in an emission-position changing mechanism is different. In the following explanation, the same or substantially the same portions as the portions explained above are denoted by the same reference numerals and signs and explanation of the portions is omitted.

Configuration of a Light Source Device

Figure 11:
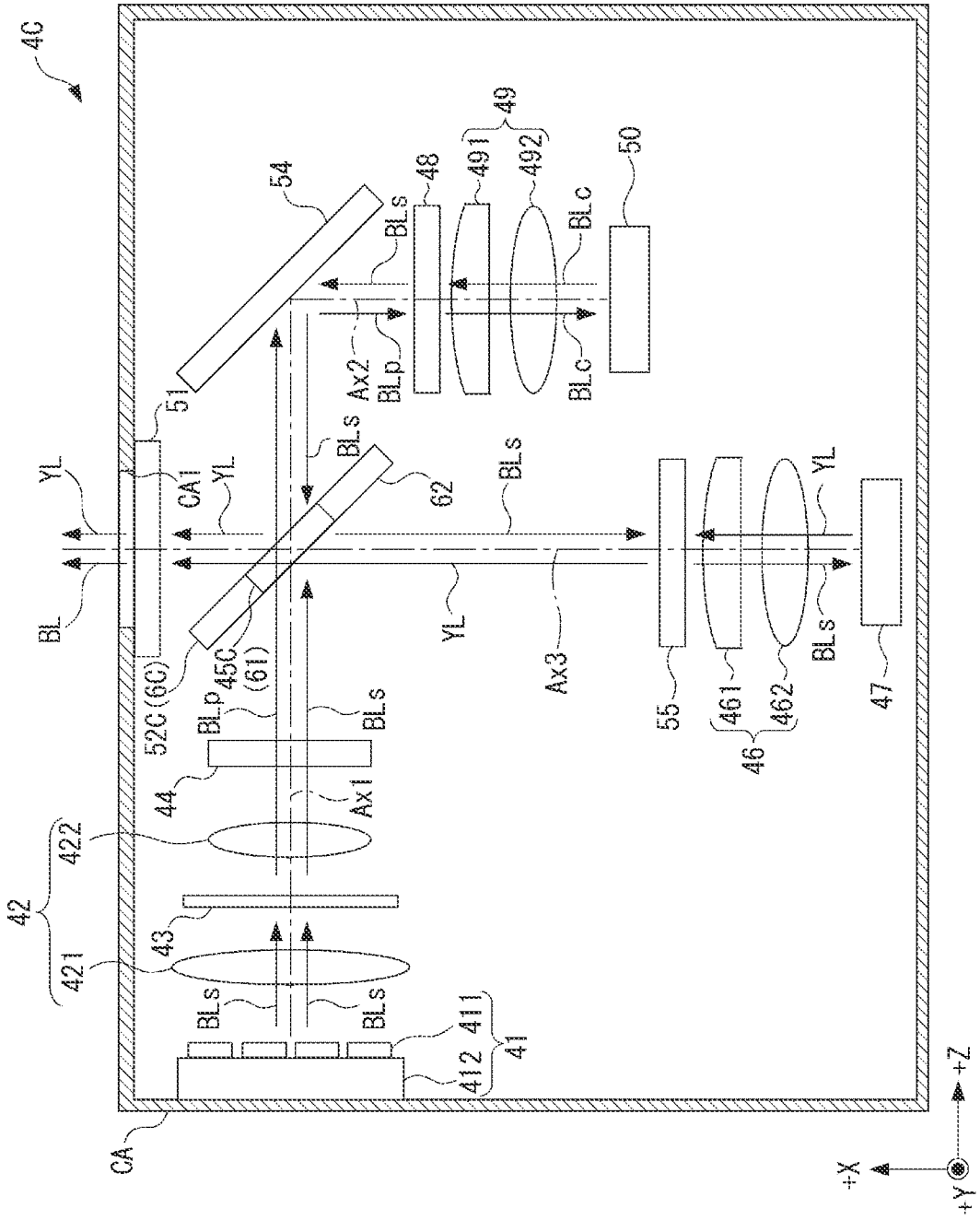
FIG. 11 is a schematic diagram showing the configuration a light source device included in a projector in a third embodiment.

FIG. 11 is a schematic diagram showing the configuration of a light source device 4C included in the projector according to this embodiment.

The projector according to this embodiment includes the same configuration as the configuration of the projector 1A according to the first embodiment except that the projector includes the light source device 4C shown in FIG. 11 instead of the light source device 4A according to the first embodiment.

The light source device 4C includes the same configuration as the configuration of the light source device 4A according to the first embodiment except that the light source device 4C includes a light separating and combining element 45C, an emission-position changing mechanism 52C, a reflection mirror 54, and an optical-path changing element 55 instead of the light separating and combining element 45 and the emission-position changing mechanism 52A.

In the light source device 4C, compared with the light source device 4A, the positions of the first condensing element 46, the wavelength conversion element 47, the second phase difference element 48, the second condensing element 49, and the diffusion optical element 50 are different.

That is, the light source device 4C includes the first light source 41, the afocal optical element 42, the first phase difference element 43, the diffusing and transmitting element 44, the light separating and combining element 45C, the first condensing element 46, the wavelength conversion element 47, the second phase difference element 48, the second condensing element 49, the diffusion optical element 50, the third phase difference element 51, the emission-position changing mechanism 52C, the control section 53A, the reflection mirror 54, and the optical-path changing element 55.

The light source device 4C may include the control section 53B according to the second embodiment instead of the control section 53A.

The illumination optical axes Ax1, Ax2, and Ax3 are set in the light source device 4C.

The first light source 41, the afocal optical element 42, the first phase difference element 43, the diffusing and transmitting element 44, the light separating and combining element 45C, and the reflection mirror 54 are disposed on the illumination optical axis Ax1.

The reflection mirror 54, the second phase difference element 48, the second condensing element 49, and the diffusion optical element 50 are disposed on the illumination optical axis Ax2. That is, the reflection mirror 54 is disposed in the crossing part of the illumination optical axis Ax1 and the illumination optical axis Ax2. In other words, the reflection mirror 54 is disposed in the same position as the position of the emission-position changing element 6A1 in the light source device 4A.

The third phase difference element 51, the light separating and combining element 45C, the optical-path changing element 55, the first condensing element 46, and the wavelength conversion element 47 are disposed on the illumination optical axis Ax3. That is, the light separating and combining element 45C is disposed in the crossing part of the illumination optical axis Ax1 and the illumination optical axis Ax2.

In this way, in the light source device 4C, the disposition of the first light source 41, the afocal optical element 42, the first phase difference element 43, and the diffusing and transmitting element 44 is the same as the disposition in the light source device 4A.

In the light source device 4C, an optical path length between the light separating and combining element 45C and the wavelength conversion element 47 and an optical path length between the light separating and combining element 45C and the diffusion optical element 50 are substantially the same.

Configuration of the Light Separating and Combining Element

Like the light separating and combining element 45, the light separating and combining element 45C is a polarized beam splitter that separates a p-polarized light component and an s-polarized light component included in light made incident thereon. Although not illustrated, the light separating and combining element 45C is configured by a light transmissive substrate formed by stacking dielectric multi-layer films. The light separating and combining element 45C reflects the s-polarized light component and transmits the p-polarized light component. That is, the light separating and combining element 45C has a light separating characteristic for separating a part of light made incident thereon and the remaining light. In this embodiment, the light separating and combining element 45C reflects the blue light BLs and transmits the blue light BLp of the blue lights BLs and BLp made incident from the diffusing and transmitting element 44.

The light separating and combining element 45C transmits light having a wavelength equal to or larger than a predetermined wavelength irrespective whether a polarized light component is the s-polarized light component or the p-polarized light component.

In this embodiment, the light separating and combining element 45C transmits light having a wavelength larger than a wavelength of the blue light. Specifically, the light separating and combining element 45C transmits the fluorescent light YL emitted from the wavelength conversion element 47 explained below.

The light separating and combining element 45C may have a function of a half mirror for transmitting a part of light made incident thereon and reflecting the remaining light and a function of a dichroic mirror for reflecting the blue light and transmitting the fluorescent light YL.

In this case, the first phase difference element 43 and the second phase difference element 48 can be omitted.

The blue light BLp transmitted through the light separating and combining element 45C in the +Z direction is reflected in the −X direction by the reflection mirror 54. The blue light BLp is made incident on the second phase difference element 48 and converted into the blue light BLc. The blue light BLc is made incident on the diffusion optical element 50 as excitation light via the second condensing element 49.

The blue light BLc reflected and diffused by the diffusion optical element 50 is made incident on the second phase difference element 48 via the second condensing element 49 and converted into the s-polarized blue light BLs. The blue light BLs is reflected in the −Z direction by the reflection mirror 54 and made incident on the light separating and combining element 45C.

The blue light BLs made incident on the light separating and combining element 45C from the reflection mirror 54 is reflected in the +X direction by the light separating and combining element 45C and emitted to the outside of the light source device 4C via the third phase difference element 51.

The blue light BLs reflected in the −X direction by the light separating and combining element 45 travels along the illumination optical axis Ax3 and is made incident on the wavelength conversion element 47 as excitation light via the optical-path changing element 55 and the first condensing element 46.

The optical-path changing element 55 is explained in detail below.

The wavelength conversion element 47 emits the fluorescent light YL obtained by converting a wavelength of the blue light BLs to an incident side of the blue light BLs, that is, in the +X direction. The fluorescent light YL emitted from the wavelength conversion element 47 is made incident on the light separating and combining element 45C via the first condensing element 46 and the optical-path changing element 55. The fluorescent light YL made incident on the light separating and combining element 45C is transmitted through the light separating and combining element 45C and the third phase difference element 51 in the +X direction and emitted from the light source device 4C.

Configuration of the Emission-Position Changing Mechanism

Like the emission-position changing mechanism 52A, the emission-position changing mechanism 52C refracts or reflects light made incident thereon and changes an emission position of the incident light.

The emission-position changing mechanism 52C includes an emission-position changing element 6C including the supporting member 62 that holds the light separating and combining element 45C. That is, the emission-position changing element 6C includes the light separating and combining element 45C functioning as the optical element 61 and the supporting member 62 that displaces the light separating and combining element 45C.

The emission-position changing mechanism 52C displaces the light separating and combining element 45C with respect to the illumination optical axes Ax1 and Ax3 to thereby change an emission direction and an emission position of light reflected by the light separating and combining element 45C.

Specifically, the emission-position changing mechanism 52C displaces the light separating and combining element 45C and changes a reflection direction of the blue light BLs made incident from the diffusing and transmitting element 44 to thereby change an incident position of the blue light BLs (the excitation light) in the wavelength conversion element 47.

The emission-position changing mechanism 52C displaces the light separating and combining element 45C to thereby change, with refraction in the light separating and combining element 45C, an emission direction of the blue light BLp made incident from the diffusing and transmitting element 44.

As in the example explained in the first embodiment, the incident position of the blue light BLs in the wavelength conversion element 47 changes, whereby an emission position of the fluorescent light YL transmitted through the light separating and combining element 45C and emitted from the light source device 4C also changes.

The light separating and combining element 45C is displaced, whereby an emission position of the blue light BL (the diffused light) emitted from the light source device 4C changes.

In this way, by displacing the light separating and combining element 45C, the emission-position changing mechanism 52C can simultaneously change all of the incident position of the blue light BLs (the excitation light) in the wavelength conversion element 47, the incident position of the blue light BLc (the light to be diffused) in the diffusion optical element 50, the emission position of the fluorescent light YL (the converted light) from the light source device 4C, and the emission position of the blue light BL (the diffused light) from the light source device 4C.

That is, the emission position of the fluorescent light YL from the light source device 4C and the emission position of the blue light BL from the light source device 4C can be changed in the same direction, at the same speed, and in the same cycle in synchronization with each other by the emission-position changing mechanism 52C.

Configuration of the Optical-Path Changing Element

When the optical-path changing element 55 is absent and the light separating and combining element 45C is displaced by the emission-position changing mechanism 52C, the optical axis of the fluorescent light YL (the converted light) emitted from the light source device 4C and the optical axis of the blue light BL (the diffused light) emitted from the light source device 4C are located on the opposite sides each other across the illumination optical axes Ax and Ax3.

In contrast, the optical-path changing element 55 is disposed between the light separating and combining element 45C and the first condensing element 46 or between the light separating and combining element 45C and the second condensing element 49, whereby the optical axis of the fluorescent light YL emitted from the light source device 4C and the optical axis of the blue light BL emitted from the light source device 4C are substantially matched.

In this embodiment, the optical-path changing element 55 is provided on an optical path between the light separating and combining element 45C and the first condensing element 46. The optical-path changing element 55 shifts the optical axis of the blue light BLs made incident from the light separating and combining element 45C and shifts the optical axis of the fluorescent light YL made incident from the wavelength conversion element 47 via the first condensing element 46.

By providing such an optical-path changing element 55, it is possible to substantially match the optical axis of the fluorescent light YL (the converted light) and the optical axis of the blue light BLs (the diffused light) emitted from the light separating and combining element 45C and it is possible to match the emission position of the fluorescent light YL and the emission position of the blue light BL emitted from the light source device 4C.

The optical-path changing element 55 can be configured by, for example, a lens.

Effects of the Third Embodiment

The projector according to this embodiment explained above achieves the same effects as the effects of the projector 1A according to the first embodiment. Besides the projector achieves the following effects.

In the light source device 4C, the emission-position changing mechanism 52C displaces the light separating and combining element 45C to thereby change the incident position of the blue light BLs (the excitation light) on the wavelength conversion element 47, the incident position of the blue light BLc (the light to be diffused) on the diffusion optical element 50, the emission position of the fluorescent light YL (the converted light) made incident from the wavelength conversion element 47 and emitted from the light separating and combining element 45C, and the emission position of the blue light BLs (the diffused light) made incident from the diffusion optical element 50 and emitted from the light separating and combining element 45C.

With such a configuration, since the emission-position changing mechanism 52C displaces the light separating and combining element 45C, compared with when the projector includes an emission-position changing mechanism including a plurality of emission-position changing elements 6, it is possible to simplify the configuration of the light source device 4C.

In the light source device 4C, the emission-position changing mechanism 52C changes, according to a refractive index of the light separating and combining element 45C, an emission position of light transmitted through the light separating and combining element 45C.

With such a configuration, by adjusting an angle of the light separating and combining element 45C, it is possible to easily change the emission position of the light transmitted through the light separating and combining element 45C. Therefore, it is possible to simplify the configuration of the light source device 4C.

Modification of the Third Embodiment

In the light source device 4C, the first condensing element 46 and the wavelength conversion element 47 are disposed on the illumination optical axis Ax3 and the second phase difference element 48, the second condensing element 49, and the diffusion optical element 50 are disposed on the illumination optical axis Ax2.

However, not only this, but the first condensing element 46 and the wavelength conversion element 47 may be disposed on the illumination optical axis Ax2 and the second phase difference element 48, the second condensing element 49, and the diffusion optical element 50 may be disposed on the illumination optical axis Ax3.

In this case, the light separating and combining element 45 is adopted as a light separating and combining element.

The light source device 4C includes the reflection mirror 54 that reflects the blue light BLp made incident from the light separating and combining element 45C and guides the blue light BLP to the diffusion optical element 50.

However, not only this, but the light source device 4C may not include a reflection mirror. That is, in the light source device 4C, the second phase difference element 48, the second condensing element 49, and the diffusion optical element 50 may be disposed on the illumination optical axis Ax1.

On the other hand, as in the light source device 4A, the first condensing element 46 and the wavelength conversion element 47 may be disposed on the illumination optical axis Ax4 and the reflection mirror may be disposed in the crossing part of the illumination optical axes Ax3 and Ax4.

Fourth Embodiment

A fourth embodiment of the present disclosure is explained below.

A projector according to this embodiment includes the same functions as the functions of the projector according to the first embodiment. However, the configuration of an image projection device is different. In the following explanation, the same or substantially the same portions as the portions explained above are denoted by the same reference numerals and signs and explanation of the portions is omitted.

Figure 12:
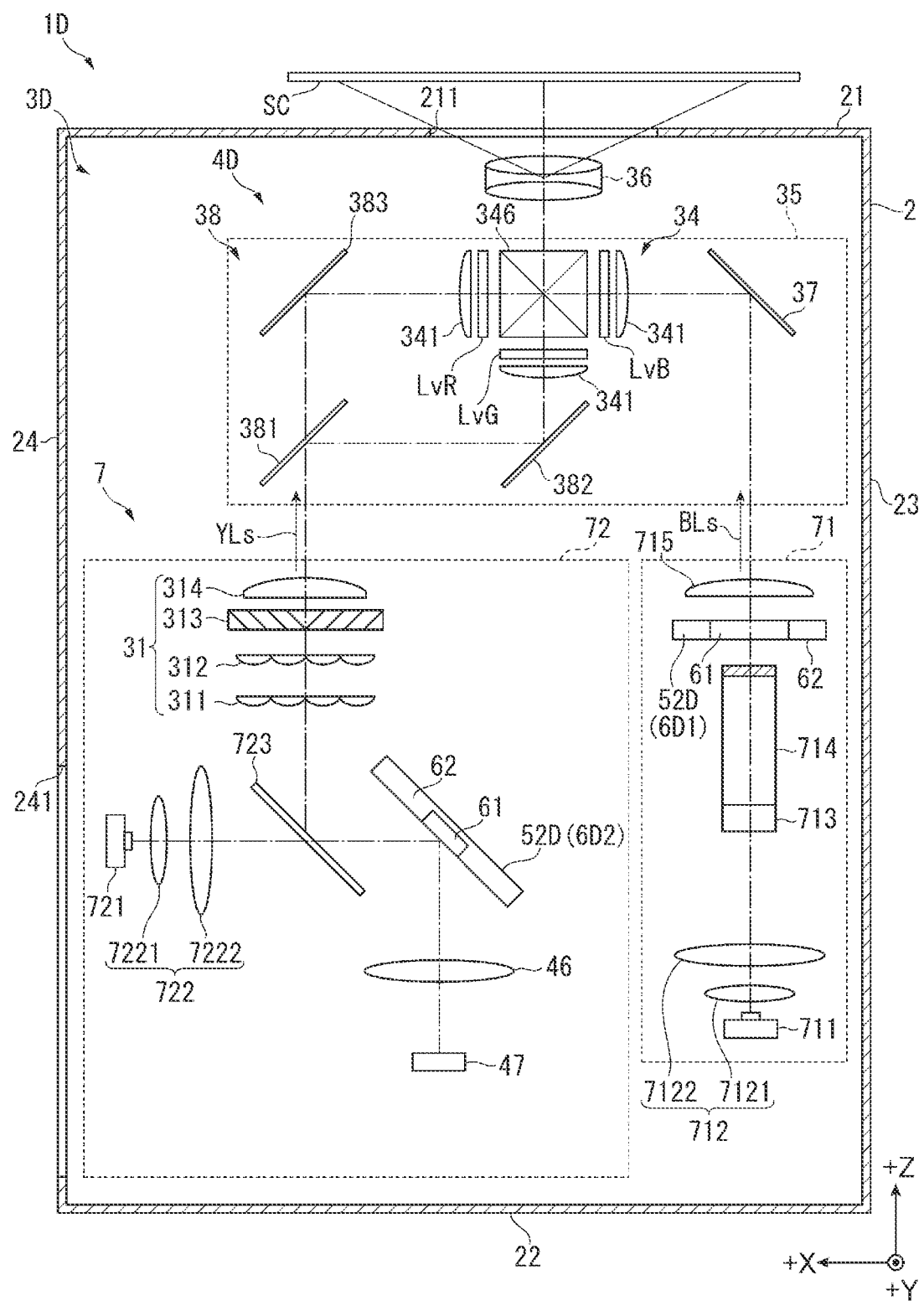
FIG. 12 is a schematic diagram showing the configuration of a projector in a fourth embodiment.

FIG. 12 is a schematic diagram showing the configuration of a projector 1D according to this embodiment. In FIG. 12, illustration of the viewing angle compensation plates 344 is omitted.

Like the projector 1A according to the first embodiment, the projector 1D according to this embodiment modulates light emitted from a light source device 4D, forms image light corresponding to image information, and enlarges and projects the formed image light onto a projection surface such as a screen.

The projector 1D includes the same components and the same functions as the components and the functions of the projector 1A according to the first embodiment except that the projector 1D includes an image projection device 3D shown in FIG. 12 instead of the image projection device 3A according to the first embodiment.

Configuration of the Image Projection Device

Like the image projection device 3A, the image projection device 3D forms image light corresponding to image information input from a not-shown control device and projects the formed image light onto a projection surface such as the screen SC. The image projection device 3D includes the same components and the same functions as the components and the functions of the image projection device 3A except that the image projection device 3D includes a light source device 7, a light guide member 37, and a color separation device 38 instead of the light source device 4A, the uniformizing device 31, the color separation device 32, and the relay device 33. That is, the image projection device 3D includes the light source device 7, the image emission device 34, the housing for optical components 35, the projection optical device 36, the light guide member 37, and the color separation device 38.

Schematic Configuration of the Light Source Device

Like the light source device 4A, the light source device 7 emits illumination light for illuminating the modulation regions of the light modulation devices 343 configuring the image emission device 34. The light source device 7 includes a first light source section 71 that emits the blue light BLs (the first color light) as first light source light, a second light source section 72 that emits fluorescent light YLs (converted light) as second light source light, and an emission-position changing mechanism 52D.

The configurations of the first light source section 71 and the second light source section 72 are explained in detail below.

Like the emission-position changing mechanism 52A, the emission-position changing mechanism 52D changes an emission position of the blue light BLs emitted from the light source device 7 and an emission position of the fluorescent light YLs. The emission-position changing mechanism 52D includes an emission-position changing element 6D1 provided in the first light source section 71 and an emission-position changing element 6D2 provided in the second light source section 72.

Configuration of the Light Guide Member

The light guide member 37 is a total reflection mirror disposed on an optical path of the blue light BLs emitted from the first light source section 71. The light guide member 37 reflects, in the +X direction, the blue light BLs made incident from the first light source section 71 and guides the blue light BLs to the liquid crystal light valve LvB via a field lens 341 for blue light.

Configuration of the Color Separation Device

The color separation device 38 guides a first color component and a second color component separated from fluorescent light made incident from the second light source section 72 to liquid crystal light valves corresponding to the first color component and the second color component. Specifically, the color separation device 38 separates the fluorescent light YLs made incident from the second light source section 72 into green light and red light, guides the separated green light to the liquid crystal light valve LvG via the field lens 341 for green light, and guides the separated red light to the liquid crystal light valve LvR via the field lens 341 for red light.

The color separation device 38 includes a dichroic mirror 381 and reflection mirrors 382 and 383.

The dichroic mirror 381 transmits, in the +Z direction, the red light included in the fluorescent light YLs made incident from the second light source section 72 and reflects the green light in the −X direction.

The reflection mirror 382 reflects, in the +Z direction, the green light reflected by the dichroic mirror 381. The green light reflected by the reflection mirror 381 is made incident on the liquid crystal light valve LvG via the field lens 341 for green light.

The reflection mirror 383 reflects, in the −X direction, the red light transmitted through the dichroic mirror 381. The red light reflected by the reflection mirror 383 is made incident on the liquid crystal light valve LvR via the field lens 341 for red light.

Configuration of the First Light Source Section

The first light source section 71 emits the blue light BLs in the +Z direction. The first light source section 71 includes a first light source 711, a condensing element 712, a scatter plate 713, a polarization conversion integrator rod 714, the emission-position changing element 6D1, and a superimposing lens 715.

The first light source 711 emits the blue light (the first color light). Although not illustrated in detail, like the first light source 41, the first light source 711 includes the substrate 412 on which the plurality of solid-state light sources 411 configured by semiconductor lasers that emit the blue light are arrayed.

The condensing element 712 is disposed in the +Z direction with respect to the first light source 711 and condenses the blue light BLs emitted from the first light source 711. In an example shown in FIG. 12, the condensing element 712 is configured by two lenses 7121 and 7122. However, the number of lenses configuring the condensing element 712 does not matter.

The scatter plate 713 is disposed in the +Z direction with respect to the condensing element 712. The scatter plate 713 scatters the blue light made incident from the condensing element 712 to be blue light having an orientation distribution similar to an orientation distribution of fluorescent light emitted from the wavelength conversion element 47. As the scatter plate 713, for example, a micro-lens array can be used.

The polarization conversion integrator rod 714 is disposed in the +Z direction with respect to the scatter plate 713. The polarization conversion integrator rod 714 uniformizes an in-plane light intensity distribution of the blue light emitted from the first light source 711 and made incident via the condensing element 712 and the scatter plate 713 and converts the blue light into the blue light BLs, which is linearly polarized light.

Although not illustrated in detail, the polarization conversion integrator rod 714 includes an integrator rod, a reflection plate disposed on an incident surface side of the integrator rod, and a reflection-type polarization plate disposed on an emission surface side of the integrator rod. The reflection plate includes a small hole in which the blue light is made incident.

A configuration including the lens arrays 311 and 312 and the polarization conversion element 313 explained in the first embodiment may be adopted instead of the polarization conversion integrator rod 714.

If the scatter plate 713 can diffuse the blue light made incident from the condensing element 712 like the diffusing and transmitting element 44, a polarization plate may be disposed instead of the polarization conversion integrator rod 714.

The superimposing lens 715 is disposed in the +Z direction with respect to the polarization conversion integrator rod 714. The superimposing lens 715 superimposes, on the liquid crystal light valve LvB, the blue light BLs emitted from the polarization conversion integrator rod 714 and transmitted through the emission-position changing element 6D1.

Configuration of the Emission-Position Changing Element of the First Light Source Section The emission-position changing element 6D1 is equivalent to the second emission-position changing element. The emission-position changing element 6D1 is disposed between the polarization conversion integrator rod 714 and the superimposing lens 715 and changes an emission position of the blue light BLs made incident from the polarization conversion integrator rod 714.

Like the emission-position changing element 6, the emission-position changing element 6D1 includes the optical element 61 and the supporting member 62 that supports the optical element 61 to be displaceable. The optical element 61 in the emission-position changing element 6D1 is a light transmitting element such as glass that transmits light made incident thereon. The optical element 61 is turned centering on the turning axes Rx1 and Rx2 by the supporting member 62 to change an angle with respect to an orthogonal surface orthogonal to the optical axis of the blue light BLs made incident on the optical element 61.

Accordingly, according to a refractive index of the optical element 61, the emission-position changing element 6D1 shifts the optical axis of light transmitted through the optical element 61 and changes an emission position of the light transmitted through the optical element 61.

That is, the optical element 61 is displaced, whereby an emission position of the blue light BLs from the optical element 61 changes.

An emission position of the blue light BLs by the emission-position changing element 6D1 is changed by the control section 53A included in the light source device 7 in the same direction, in the same cycle, and at the same speed in synchronization with an emission position of fluorescent light by the emission-position changing element 6D2.

Configuration of the Second Light Source Section

The second light source section 72 emits the fluorescent light YLs, which is the converted light, in the +Z direction. The second light source section 72 includes a second light source 721, a collimate optical element 722, a dichroic mirror 723, the first condensing element 46, the wavelength conversion element 47, the emission-position changing element 6D2, and the uniformizing device 31.

Configurations of the Second Light Source and the Collimate Optical Element

The second light source 721 emits, in the −X direction, excitation light for exciting the phosphor of the wavelength conversion element 47. Although not illustrated, the second light source 721 includes a substrate on which a plurality of solid-state light sources configured by semiconductor lasers that emit the blue light, which is the excitation light, are arrayed. A peak of light emission intensity of the blue light is, for example, 440 nm. The blue light emitted by the second light source 721 may be either the blue light BLs or the blue light BLp or may be light in which the blue light BLs and the blue light BLp are mixed.

The collimate optical element 722 is disposed in the −X direction with respect to the second light source 721 and collimates the blue light made incident from the second light source 721. In an example shown in FIG. 11, the collimate optical element 722 is configured by the two lenses 7221 and 7222. However, the number of lenses configuring the collimate optical element 722 does not matter.

Configuration of the Dichroic Mirror

The dichroic mirror 723 is disposed in the −X direction with respect to the collimate optical element 722 and transmits the blue light made incident in the −X direction from the collimate optical element 722. The blue light transmitted through the dichroic mirror 723 is made incident on the emission-position changing element 6D2. The blue light BLs made incident on the emission-position changing element 6D2 is reflected in the −Z direction and made incident on the wavelength conversion element 47 via the first condensing element 46.

As explained above, the wavelength conversion element 47 convers a wavelength of the blue light made incident thereon and emits the fluorescent light, which is the converted light, to an incident side of the blue light.

That is, when the blue light is made incident in the −Z direction, the wavelength conversion element 47 emits the fluorescent light in the +Z direction. The fluorescent light emitted from the wavelength conversion element 47 is collimated by the first condensing element 46 and thereafter made incident on the emission-position changing element 6D2.

The fluorescent light reflected in the +X direction by the emission-position changing element 6D2 is reflected in the +Z direction by the dichroic mirror 723 and made incident on the uniformizing device 31. The fluorescent light is converted into s-polarized fluorescent light YLs by the polarization conversion element 313 and emitted from the second light source section 72.

Configuration of the Emission-Position Changing Element of the Second Light Source Section The emission-position changing element 6D2 is equivalent to the first emission-position changing element. Like the emission-position changing element 6A1 according to the first embodiment, the emission-position changing element 6D2 reflects the blue light (the excitation light) made incident thereon and changes an incident position of the blue light in the wavelength conversion element 47. The emission-position changing element 6D2 reflects the fluorescent light (the converted light) made incident from the wavelength conversion element 47 via the first condensing element 46 and changes an emission position of the fluorescent light to the dichroic mirror 723 and an emission position of the fluorescent light from the light source device 7.

Like the emission-position changing elements 6A1 and 6A2, the emission-position changing element 6D2 includes the optical element 61, which is a reflection element, and the supporting member 62 that supports the optical element 61 to be displaceable.

Changes of the Emission Positions of the Blue Light and the Fluorescent Light by the Emission-Position Changing Mechanism Under the control by the control section 53A, the emission-position changing mechanism 52D causes the emission-position changing elements 6D1 and 6D2 to operate in synchronization with each other and changes the emission position of the blue light BLs from the first light source section 71 and the emission position of the fluorescent light YLs from the second light source section 72 in the same direction in synchronization with each other.

Consequently, when the blue light BLs and the fluorescent light YLs are combined on the outside of the light source device 7, it is possible to make it easy to match the optical axis of the blue light BLs and the optical axis of the fluorescent light YLs. Therefore, it is possible to prevent color unevenness from occurring in light obtained by combining the blue light BLs and the fluorescent light YLs. Further, it is possible to prevent color unevenness from occurring in image light obtained by modulating and combining the color lights.

Effects of the Fourth Embodiment

With the projector according to this embodiment explained above, the same effects as the effects of the projector 1A according to the first embodiment are achieved. Besides, the following effects are achieved.

The light source device 4D includes the second light source 721 that emits the blue light, which is the excitation light, besides the first light source 711 that emits the blue light, which is the first color light. The emission-position changing mechanism 52D includes the emission-position changing elements 6D1 and 6D2. The emission-position changing element 6D1 is equivalent to the second emission-position changing element and changes an emission position from the light source device 4D of the blue light BLs (the diffused light) emitted and diffused from the first light source 711. The emission-position changing element 6D2 is equivalent to the first emission-position changing element and changes an emission position from the light source device 4D of the fluorescent light YLs (the converted light) emitted from the wavelength conversion element 47 and converted. The emission-position changing elements 6D1 and 6D2 change, in synchronization with each other, the emission position of the blue light BLs from the light source device 4D and the emission position of the fluorescent light YLs from the light source device 4D in the same direction.

With such a configuration, it is possible to prevent color unevenness from occurring in light obtained by combining the blue light BLs (the diffused light) emitted from the light source device 4D and the fluorescent light YLs (the converted light) emitted from the light source device 4D. Accordingly, it is possible to prevent color unevenness from occurring in image light projected by the projector 1D.

In the light source device 4D, the emission-position changing elements 6D1 and 6D2 are optical path shift devices that change an emission position of light made incident thereon. Each of the emission-position changing elements 6D1 and 6D2, which are the optical path shift devices, includes the optical element 61 including the incident surface 611 on which light is made incident and the driving element 67. The driving element 67 turns the optical element 61 centering on the turning axes Rx1 and Rx2 extending along two directions included in the incident surface 611 and orthogonal to each other.

In this embodiment, the optical element 61 included in the emission-position changing element 6D1 is a light transmitting element and the optical element 61 included in the emission-position changing element 6D2 is a reflection element. The driving element 67 includes the first driving element 68 that turns the optical element 61 centering on the turning axis Rx1 extending along the +D1 direction included in the incident surface 611 and the second driving element 69 that turns the optical element 61 centering on the turning axis Rx2 extending along the +D2 direction included in the incident surface 611 and orthogonal to the +D1 direction.

With such a configuration, by displacing the optical element 61, the driving element 67 can change an emission position of light made incident on the optical element 61. The emission-position changing elements 6D1 and 6D2 having the functions explained above can be configured by such optical path shift devices.

Fifth Embodiment

A fifth embodiment of the present disclosure is explained below.

A projector according to this embodiment includes the same configuration as the configuration of the projector 1A according to the first embodiment but is different in that the projector includes a transmission-type emission-position changing element. In the following explanation, the same or substantially the same portions as the portions explained above are denoted by the same reference numerals and signs and explanation of the portions is omitted.

Figure 13:
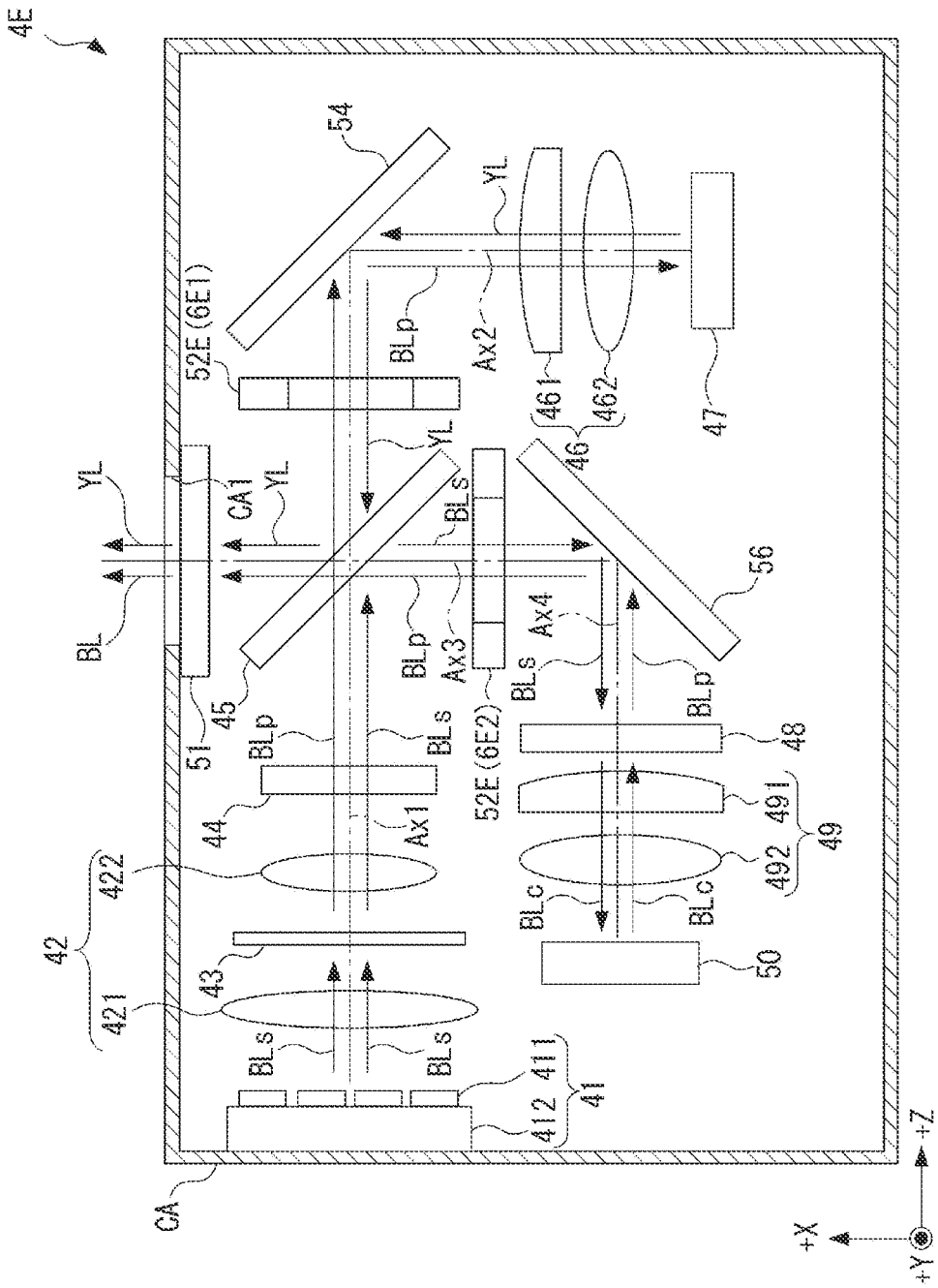
FIG. 13 is a schematic diagram showing the configuration of a light source device included in a projector in a fifth embodiment.

FIG. 13 is a schematic diagram showing the configuration of a light source device 4E included in the projector according to this embodiment.

The projector according to this embodiment includes the same configuration as the configuration of the projector 1A according to the first embodiment except that the projector includes the light source device 4E shown in FIG. 13 instead of the light source device 4A according to the first embodiment.

The light source device 4E includes the same configuration as the configuration of the light source device 4A according to the first embodiment except that the light source device 4E includes an emission-position changing mechanism 52E and reflection mirrors 54 and 56 instead of the emission-position changing mechanism 52A.

That is, the light source device 4E includes the first light source 41, the afocal optical element 42, the first phase difference element 43, the diffusing and transmitting element 44, the light separating and combining element 45, the first condensing element 46, the wavelength conversion element 47, the second phase difference element 48, the second condensing element 49, the diffusion optical element 50, the third phase difference element 51, the emission-position changing mechanism 52E, the control section 53A, and the reflection mirrors 54 and 56.

The light source device 4E may include the control section 53B according to the second embodiment instead of the control section 53A.

The reflection mirrors 54 and 56 reflect light made incident thereon.

The reflection mirror 54 is provided in the same position as the position of the emission-position changing element 6A1 in the light source device 4A. The reflection mirror 54 reflects, in the −X direction, toward the wavelength conversion element 47, the blue light BLp (the excitation light) made incident in the +Z direction from the light separating and combining element 45. The reflection mirror 54 reflects, in the −Z direction, toward the light separating and combining element 45, the fluorescent light YL (the converted light) made incident in the +X direction from the wavelength conversion element 47 via the first condensing element 46.

The reflection mirror 56 is provided in the same position as the position of the emission-position changing element 6A2 in the light source device 4A. The reflection mirror 56 reflects, in the −Z direction, toward the diffusion optical element 50, the blue light BLs (the light to be diffused) made incident in the −X direction from the light separating and combining element 45. The reflection mirror 56 reflects, in the +X direction, toward the light separating and combining element 45, the blue light BLp (the diffused light) made incident in the +Z direction from the diffusion optical element 50 via the second condensing element 49 and the second phase difference element 48.

Like the emission-position changing mechanisms 52A, 52C, and 52D, the emission-position changing mechanism 52E changes, under the control by the control section 53A, an emission position of light made incident thereon. The emission-position changing mechanism 52E includes emission-position changing elements 6E1 and 6E2. Each of the emission-position changing elements 6E1 and 6E2 includes the same configuration as the configuration of the emission-position changing element 6D1 according to the fourth embodiment.

That is, the emission-position changing elements 6E1 and 6E2 are transmission-type optical path shift devices.

The emission-position changing element 6E1 is equivalent to the first emission-position changing element and is provided on an optical path between the light separating and combining element 45 and the wavelength conversion element 47.

In this embodiment, the emission-position changing element 6E1 is provided between the light separating and combining element 45 and the reflection mirror 54. The emission-position changing element 6E1 shifts an optical path of the blue light BLp (the excitation light) made incident thereon and changes the incident position of the blue light BLp in the wavelength conversion element 47.

The emission-position changing element 6E1 shifts an optical path of the fluorescent light YL (the converted light) made incident thereon and changes the emission position of the fluorescent light YL to the light separating and combining element 45 to thereby change an emission position of the fluorescent light YL emitted to the outside of the light source device 4E from the light separating and combining element 45 via the third phase difference element 51.

The emission-position changing element 6E1 may be provided, for example, between the reflection mirror 54 and the first condensing element 46.

The emission-position changing element 6E2 is equivalent to the second emission-position changing element and is provided on an optical path between the light separating and combining element 45 and the diffusion optical element 50.

In this embodiment, the emission-position changing element 6E2 is provided between the light separating and combining element 45 and the reflection mirror 56. The emission-position changing element 6E2 shifts an optical path of the blue light BLs (the light to be diffused) made incident thereon and changes an incident position of the blue light BLc in the diffusing optical element 50.

The emission-position changing element 6E2 shifts an optical path of the blue light BLp (the diffused light) made incident thereon and changes an emission position of the blue light BLp to the light separating and combining element 45 to thereby change an emission position of the blue light BL emitted from the light separating and combining element 45 to the outside of the light source device 4E via the third phase difference element 51.

The emission-position changing element 6E2 may be provided, for example, between the reflection mirror 56 and the second condensing element 49.

Like the emission-position changing mechanisms 52A and 52D, under the control by the control section 53A, the emission-position changing mechanism 52E causes the emission-position changing elements 6E1 and 6E2 to operate in synchronization with each other and changes an emission position of the blue light BL from the light source device 4E and an emission position of the fluorescent light YL from the light source device 4E in the same direction in synchronization with each other.

Specifically, the emission-position changing mechanism 52E changes the emission position of the blue light BL from the light source device 4E and the emission position of the fluorescent light YL from the light source device 4E in the same direction, in the same cycle, and at the same speed in synchronization with each other.

In other words, the emission-position changing mechanism 52E changes the emission position of the blue light BL from the light source device 4E and the emission position of the fluorescent light YL from the light source device 4E in synchronization with each other such that the optical axis of the fluorescent light YL and the optical axis of the blue light BL coincide.

Consequently, it is possible to prevent color unevenness from occurring in illumination light emitted from the light source device 4E. Further, it is possible to prevent color unevenness from occurring in image light obtained by modulating and combining the color lights.

Effects of the Fifth Embodiment

The projector according to this embodiment explained above can achieve the same effects as the effects of the projector 1A according to the first embodiment.

In this embodiment, the light source device 4E shown in FIG. 13 is explained as an example of the light source device including the emission-position changing mechanism 52E including the emission-position changing elements 6E1 and 6E2, which are the transmission-type optical shift devices.

However, not only this, but in the light source device 4C having a layout shown in FIG. 11, the light separating and combining element 45 and the emission-position changing mechanism 52E may be adopted instead of the light separating and combining element 45C and the emission-position changing mechanism 52C.

Modifications of the Embodiments

The present disclosure is not limited to the embodiments explained above. Modifications, improvements, and the like in a range in which the object of the present disclosure can be achieved are included in the present disclosure.

In the embodiments, the first color light is the blue light. Specifically, the first color light is the blue light having the peak wavelength of 440 nm. However, not only this, but the first color light may be blue light having a peak at another wavelength or may be another color light.

In the embodiments, the emission-position changing elements 6A1, 6A2, 6C, 6D1, and 6E1 turn the optical element 61 centering on the turning axes Rx1 and Rx2. However, not only this, but the optical element 61 may have one turning axis.

It is also possible to rotate an emission position by controlling the turning axes Rx1 and Rx2 in combination.

In the first to third and fifth embodiments, the emission-position changing mechanisms 52A, 52C, and 52E change the emission position of the blue light (the first color light) from the light source device and the emission position of the fluorescent light (the converted light) from the light source device in the same direction, in the same cycle, and at the same speed in synchronization with each other.

In the fourth embodiment, the emission-position changing mechanism 52D changes the emission position of the blue light BLs (the first color light) from the first light source section 71 of the light source device 7 and the emission position of the fluorescent light YLs (the converted light) from the second light source section 72 of the light source device 7 in the same direction in synchronization with each other.

However, not only this, but the emission-position changing mechanism only has to change an emission position of the first color light from the light source device and an emission position of the converted light from the light source device in the same direction in synchronization with each other.

In the first, second, and fifth embodiments, by the light separating and combining element 45, the blue light BLp, which is a part of the blue light, of the blue lights BLp and BLs emitted from the first light source 41 and made incident via the first phase difference element 43 is emitted as the excitation light and the blue light BLs, which is the remaining blue light, is emitted as the light to be diffused.

In the third embodiment, by the light separating and combining element 45C, the blue light BLs, which is a part of the blue light, of the blue lights BLp and BLs emitted from the first light source 41 and made incident via the first phase difference element 43 is emitted as the excitation light and the blue light BLp, which is the remaining blue light, is emitted as the light to be diffused. In the first to third and fifth embodiments, each of the light source devices 4A, 4B, 4C, and 4E includes the diffusion optical element 50 that diffuses the light to be diffused emitted from each of the light separating and combining elements 45 and 45C and emits the light to be diffused as the diffused light.

However, not only this, but the light source device may include a second light source different from the first light source and a light combining element, make the first color light emitted from the first light source incident on one of the wavelength conversion element and the diffusion optical element, make the light emitted from the second light source incident on the other of the wavelength conversion element and the diffusion optical element, and combine the converted light and the diffused light in a light combining element.

In this case, light made incident on the wavelength conversion element and wavelength-converted into fluorescent light is the excitation light and light made incident on the diffusion optical element and diffused is the light to be diffused.

In the first, second, and fifth embodiments, the emission-position changing mechanisms 52A and 52E include the emission-position changing elements 6A1 and 6E1 functioning as the first emission-position changing element and the emission-position changing elements 6A2 and 6E2 functioning as the second emission-position changing element. The emission-position changing elements 6A1 and 6E1 are provided on the optical path between the light separating and combining element 45 and the wavelength conversion element 47 and changes the incident position of the blue light (the excitation light) in the wavelength conversion element 47 and the emission position to the light separating and combining element 45 of the fluorescent light (the converted light) made incident from the wavelength conversion element 47.

The emission-position changing elements 6A2 and 6E2 are provided on the optical path between the light separating and combining element 45 and the diffusion optical element 50 and change the incident position of the blue light (the light to be diffused) in the diffusion optical element 50 and the emission position to the light separating and combining element 45 of the diffused light (the blue light) made incident from the diffusion optical element 50.

The emission-position changing mechanisms 52A and 52E change, with the emission-position changing elements 6A1 and 6E1 and the emission-position changing elements 6A2 and 6E2, the emission position of the blue light (the diffused light) from the light separating and combining element 45 and the emission position of the fluorescent light (the converted light) from the light separating and combining element 45 in the same direction in synchronization with each other.

However, not only this, but an emission-position changing element that changes an incident position of excitation light in a wavelength conversion element and an emission-position changing element that changes an emission position to a light separating and combining element of converted light made incident from the wavelength conversion element may be separately provided.

Similarly, an emission-position changing element that changes an incident position of light to be diffused in the diffusion optical element and an emission-position changing element that changes an emission position to the light separating and combining element of diffused light made incident from the diffusion optical element may be separately provided.

That is, the number of emission-position changing elements included in an emission-position changing mechanism is not limited to two or less and may be three or more.

In the first and second embodiments, each of the emission-position changing elements 6A1 and 6A2 includes the optical element 61, which is the reflection element. In the fifth embodiment, each of the emission-position changing elements 6E1 and 6E2 includes the optical element 61, which is the light transmitting element.

However, not only this, but an emission-position changing mechanism included in a light source device may include an emission-position changing element including an optical element, which is a reflection element, and an emission-position changing element including the optical element 61, which is a light transmitting element.

In the third embodiment, the emission-position changing mechanism 52C displaces the light separating and combining element 45C to thereby change the incident position of the blue light BLs (the excitation light) on the wavelength conversion element 47, the incident position of the blue light BLc (the light to be diffused) on the diffusion optical element 50, the emission position of the fluorescent light YL (the converted light) made incident from the wavelength conversion element 47 and emitted from the light separating and combining element 45C, and the emission position of the blue light BLs (the diffused light) made incident form the diffusion optical element 50 and emitted from the light separating and combining element 45C.

However, not only this, but the emission-position changing mechanism 52C does not always have to change the incident position of the blue light BLc (the light to be diffused) on the diffusion optical element 50.

In the third embodiment, the emission-position changing mechanism 52C changes the emission position of the light transmitted through the light separating and combining element 45C according to the refractive index of the light separating and combining element 45C and the displacement amount of the light separating and combining element 45C.

However, not only this, but, for example, when the light separating and combining element is configured by a plurality of optical elements that separate or combine, by reflection, lights made incident thereon based on a predetermined optical characteristic, the emission-position changing mechanism may displace each of the plurality of optical elements to thereby change the incident position of the excitation light in the wavelength conversion element, the emission position of the converted light emitted from the light source device, and the emission position of the first color light emitted from the light source device.

In the first to third and fifth embodiments, the emission-position changing mechanisms 52A, 52C, and 52E change the emission position of the blue light from the light source device and the emission position of the fluorescent light from the light source device such that the optical axis of the blue light (the first color light) emitted from the light source device and the optical axis of the fluorescent light (the converted light) emitted from the light source device substantially coincide.

However, not only this, but the optical axis of the first color light emitted from the light source device and the optical axis of the converted light emitted from the light source device may not always coincide.

In the fourth embodiment, the emission-position changing mechanism 52D changes the emission position of the blue light BLs (the first color light) emitted from the first light source section 71 of the light source device 7 and the emission position of the fluorescent light YLs (the converted light) emitted from the second light source section 72 in the same direction in synchronization with each other.

However, not only this, but, depending on a use form of the light emitted from the light source device, the emission position of the blue light BLs and the emission position of the fluorescent light YLs may be changed in opposite directions in synchronization with each other.

In the fourth embodiment, the first color light emitted by the first light source section 71 is the s-polarize blue light BLs and the converted light emitted by the second light source section 72 is the s-polarized fluorescent light YLs.

However, not only this, but the first color light emitted from the first light source section 71 may be p-polarized blue light BLp or may be blue light in which s-polarized light and p-polarized light are mixed.

The converted light emitted by the second light source section 72 may be p-polarized fluorescent light YL or may be fluorescent light in which s-polarized light and p-polarized light are mixed.

In the embodiments, the emission-position changing element included in the emission-position changing mechanism is the optical path shift device that changes an emission position of light made incident thereon. The emission-position changing element includes the optical element 61 including the incident surface 611 and the supporting member 62 that supports the optical element 61.

The supporting member 62 includes the driving element 67 that turns the optical element 61 centering on the turning axis extending along at least one of the +D1 direction and the +D2 direction included in the incident surface 611 and orthogonal to each other.

However, not only this, but the configuration of the emission-position changing element is not limited to the above. That is, the emission-position changing element may have another configuration if the emission-position changing element is the optical path shift device that changes an emission position of light made incident thereon.

In the first embodiment, the light source device may cause the emission-position changing mechanism 52A to operate while the excitation light is made incident on the wavelength conversion element 47. In the second embodiment, the light source device may cause the emission-position changing mechanism 52A to operate according to the cumulative incident time of the excitation light on the wavelength conversion element 47.

However, not only this, but the light source device may cause the emission-position changing mechanism to operate according to another indicator. For example, the light source device may cause the emission-position changing mechanism to operate when the intensity of the excitation light made incident on the wavelength conversion element is higher than predetermined intensity.

In the embodiments, the wavelength conversion element 47 is the reflection-type wavelength conversion element that emits the fluorescent light, which is the converted light, to the incident side of the blue light, which is the excitation light. The diffusion optical element 50 is a diffusing and reflecting element that reflects and diffuses the light to be diffused and emits the light to be diffused as the diffused light.

However, not only this, but the wavelength conversion element adopted in the light source device may be a transmission-type wavelength conversion element that emits the converted light along an incident direction of the excitation light.

The diffusion optical element may be a transmission-type diffusion optical element that emits the diffused light along an incident direction of the light to be diffused.

In the embodiments, the projector includes the three light modulation devices 343B, 343G, and 343R.

However, not only this, but the present disclosure is also applicable to a projector including two or less or four or more light modulation devices.

In the embodiments, the light modulation device 343 is configured by the transmission-type liquid crystal panel, a light incident surface and a light emission surface of which are different.

However, not only this, but a reflection-type liquid crystal panel, a light incident surface and a light emission surface of which are the same, may be used as the light modulation device. A light modulation device other than liquid crystal such as a device including a micromirror, for example, a device including a DMD (Digital Micromirror Device) may be used if the light modulation device is capable of forming an image corresponding to image information by modulating an incident light beam.

In the embodiments, the projector is illustrated as the configuration including the light source device according to the present disclosure.

However, not only this, but the light source device can be used alone. Besides, the light source device according to the present disclosure may be applied to electronic equipment and a device other than the projector.

Overview of the Present Disclosure

An overview of the present disclosure is noted below.

A light source device according to a first aspect of the present disclosure includes: a first light source configured to emit first color light; a wavelength conversion element configured to convert a wavelength of excitation light made incident thereon and emit converted light having a wavelength larger than the wavelength of the excitation light; and an emission-position changing mechanism configured to change an emission position of the incident excitation light to thereby change an incident position of the excitation light on the wavelength conversion element and change an emission position of the first color light and an emission position of the converted light in a same direction in synchronization with each other.

With such a configuration, since the emission-position changing mechanism changes the incident position of the excitation light on the wavelength conversion element, it is possible to prevent the excitation light from being continuously made incident on a part of the wavelength conversion element. Consequently, it is possible to prevent temperature from locally rising in the wavelength conversion element to deteriorate the wavelength conversion element. Besides, it is possible to prevent wavelength conversion efficiency of the wavelength conversion element from falling.

The emission position changing mechanism changes the emission position of the first color light and the emission position of the converted light in the same direction. Consequently, it is possible to make it easy to match the optical axis of the first color light and the optical axis of the converted light emitted from the light source device. Therefore, it is possible to prevent color unevenness from occurring in light obtained by combining the first color light and the converted light.

By adopting such a light source device in a projector, it is possible to prevent color unevenness from occurring in a projected image.

In the first aspect, the light source device may further include: a light separating and combining element configured to emit, as the excitation light, a part of the first color light emitted from the first light source and emit remaining first color light as light to be diffused; and a diffusion optical element configured to diffuse the light to be diffused emitted from the light separating and combining element and emit the light to be diffused as diffused light. The light separating and combining element may combine the converted light made incident from the wavelength conversion element and the diffused light made incident from the diffusion optical element. The emission-position changing mechanism may change an emission position of the converted light emitted from the light separating and combining element and an emission position of the diffused light emitted from the diffusion optical element in a same direction in synchronization with each other.

With such a configuration, it is unnecessary to separately provide a light source that emits the excitation light and a light source that emits the light to be diffused. The light separating and combining element not only separates the first color light into the excitation light and the light to be diffused but also combines the converted light emitted from the wavelength conversion element and the diffused light emitted from the diffusion optical element.

Consequently, compared with when a light separating element that separates the first color light into the excitation light and the light to be diffused and a light combining element that combines the converted light and the diffused light are separately provided, the configuration of the light source device can be simplified. Besides, a reduction in the size of the light source device can be achieved.

An incident position of the converted light and an incident position of the diffused light in the light separating and combining element are changed in the same direction in synchronization with each other by the emission-position changing mechanism.

Consequently, an emission position of the converted light and an emission position of the diffused light emitted from the light source device via the light separating and combining element can be changed in the same direction in synchronization with each other.

Therefore, it is possible to make it easy to match the optical axis of the converted light and the optical axis of the diffused light on the outside of the light source device. It is possible to prevent color unevenness from occurring in light obtained by combining the converted light and the diffused light.

In the first aspect, the emission-position changing mechanism may include: a first emission-position changing element provided on an optical path between the light separating and combining element and the wavelength conversion element and configured to change an incident position of the excitation light in the wavelength conversion element and an emission position to the light separating and combining element of the converted light made incident from the wavelength conversion element; and a second emission-position changing element provided on an optical path between the light separating and combining element and the diffusion optical element and configured to change an incident position of the light to be diffused in the diffusion optical element and an emission position to the light separating and combining element of the diffused light made incident from the diffusion optical element. The emission-position changing mechanism may change, with the first emission-position changing element and the second emission-position changing element, an emission position of the diffused light from the light separating and combining element and an emission position of the converted light from the light separating and combining element in a same direction in synchronization with each other.

With such a configuration, the first emission-position changing element can change the emission position of the converted light from the light separating and combining element by changing the emission position of the converted light to the light separating and combining element. The second emission-position changing element can change the emission position of the diffused light from the light separating and combining element by changing the emission position of the diffused light to the light separating and combining element.

In this way, the first emission-position changing element and the second emission-position changing element operate in synchronization with each other. Consequently, it is possible to make it easy to change the emission position of the converted light and the emission position of the diffused light from the light separating and combining element in the same direction in synchronization with each other.

In the first aspect, the first emission-position changing element may reflect the excitation light emitted from the light separating and combining element toward the wavelength conversion element and reflect the converted light emitted from the wavelength conversion element toward the light separating and combining element. The second emission-position changing element may reflect the light to be diffused emitted from the light separating and combining element toward the diffusion optical element and reflect the diffused light emitted from the diffusion optical element toward the light separating and combining element.

With such a configuration, a change of the incident position of the excitation light in the wavelength conversion element and a change of the emission position of the converted light to the light separating and combining element can be simultaneously carried out by the first emission-position changing element.

Similarly, a change of the incident position of the light to be diffused in the diffusion optical element and a change of the emission position of the diffused light to the light separating and combining element can be simultaneously carried out by the second emission-position changing element.

Therefore, it is possible to prevent the configuration of the light source device from being complicated.

In the first aspect, at least one emission-position changing element of the first emission-position changing element and the second emission-position changing element may be an optical path shift device that changes an emission position of light made incident thereon. The optical path shift device may include: an optical element including an incident surface on which light is made incident; and a driving element configured to turn the optical element centering on a turning axis extending along at least one direction of two directions included in the incident surface and orthogonal to each other.

With such a configuration, it is possible to change the emission position of the incident light by displacing the optical element with the driving element. At least one emission-position changing element of the first emission-position changing element and the second emission-position changing element, the emission-position changing element having the functions explained above, can be configured by such an optical path shift device.

In the first aspect, the emission-position changing mechanism may displace the light separating and combining element to thereby change an incident position of the excitation light on the wavelength conversion element, an incident position of the light to be diffused on the diffusion optical element, an emission position of the converted light made incident from the wavelength conversion element and emitted from the light separating and combining element, and an emission position of the diffused light made incident from the diffusion optical element and emitted from the light separating and combining element.

With such a configuration, since the emission-position changing mechanism displaces the light separating and combining element, it is possible to simplify the configuration of the light source device.

In the first aspect, the emission-position changing mechanism may change, according to a refractive index of the light separating and combining element, an emission position of light transmitted through the light separating and combining element.

With such a configuration, by adjusting an angle of the light separating and combining element, it is possible to easily change the emission position of the light transmitted through the light separating and combining element.

Therefore, it is possible to simplify the configuration of the light source device.

In the first aspect, the emission-position changing mechanism may change an emission position of the first color light from the light source device and an emission position of the converted light from the light source device in synchronization with each other such that an optical axis of the first color light emitted from the light source device and an optical axis of the converted light emitted from the light source device substantially coincide.

With such a configuration, light emitted from the light source device is light obtained by combining the first color light and the converted light such that the optical axis of the first color light and the optical axis of the converted light coincide.

Consequently, it is possible to effectively prevent color unevenness from occurring in the light emitted from the light source device. In a projector in which such a light source device is adopted, it is possible to effectively prevent color unevenness from occurring in a projected image.

In the first aspect, the light source device may further include a second light source configured to emit the excitation light. The emission-position changing mechanism may include: a first emission-position changing element configured to change an emission position from the light source device of the converted light emitted from the wavelength conversion element; and a second emission-position changing element configured to change an emission position from the light source device of the first color light emitted from the first light source. The first emission-position changing element and the second emission-position changing element may change an emission position of the diffused light from the light source device and an emission position of the converted light from the light source device in a same direction in synchronization with each other.

With such a configuration, when the diffused light emitted from the light source device and the converted light emitted from the light source device are combined on the outside of the light source device, it is possible to prevent color unevenness from occurring in combined light.

In a projector in which such a light source device is adopted, it is possible to prevent color unevenness from occurring in a projected image.

In the first aspect, at least one emission-position changing element of the first emission-position changing element and the second emission-position changing element may be an optical path shift device that changes an emission position of light made incident thereon. The optical path shift device may include: an optical element including an incident surface on which light is made incident; and a driving element configured to turn the optical element centering on a turning axis extending along at least one direction of two directions included in the incident surface and orthogonal to each other.

With such a configuration, as explained above, the emission-position changing element having the functions explained above can be configured.

In the first aspect, the light source device may cause the emission-position changing mechanism to operate according to incidence of the excitation light on the wavelength conversion element.

With such a configuration, since the emission-position changing mechanism operates while the excitation light is made incident on the wavelength conversion element, it is possible to change an incident position of the excitation light in the wavelength conversion element.

Therefore, it is possible to prevent deterioration of the wavelength conversion element. Besides, it is possible to prevent wavelength conversion efficiency of the wavelength conversion element from falling.

In the first aspect, the light source device may cause the emission-position changing mechanism to operate according to a cumulative incident time of the excitation light on the wavelength conversion element.

For example, even in a state in which the incident position of the excitation light in the wavelength conversion element does not change, when the cumulative incident time of the excitation light on the wavelength conversion element is not equal to or longer than the predetermined time, it is conceivable that deterioration of the wavelength conversion element has not worsened.

In this case, by not causing the emission-position changing mechanism to operate, electric power and control for causing the emission-position changing mechanism to operate are made unnecessary.

On the other hand, when the cumulative incident time is equal to or longer than the predetermined time, it is conceivable that the deterioration of the wavelength conversion element has worsened, the wavelength conversion efficiency in the wavelength conversion element has fallen, and a light amount of fluorescent light emitted from the wavelength conversion element has decreased.

In this case, the light source device causes the emission-position changing mechanism to operate and changes the incident position of the excitation light in the wavelength conversion element. Consequently, it is possible to prevent the worsening of the deterioration of the wavelength conversion element and the fall of the wavelength conversion efficiency in the wavelength conversion element.

A projector according to a second aspect of the present disclosure includes: the light source device according to the first aspect; an image emission device configured to modulate light emitted from the light source device and emit the modulated light as image light; and a projection optical device configured to project the image light emitted from the image emission device.

With such a configuration, the same effects as the effects of the light source device can be achieved. Therefore, it is possible to prevent color unevenness from occurring in a projected image.

What is claimed is:
1. A light source device comprising:
a first light source configured to emit first color light;
a wavelength conversion element configured to convert a wavelength of excitation light made incident thereon and emit converted light having a wavelength larger than the wavelength of the excitation light;

an emission-position changing mechanism configured to change an emission position of the incident excitation light to thereby change an incident position of the excitation light on the wavelength conversion element and change an emission position of the first color light and an emission position of the converted light in a same direction in synchronization with each other;

a light separating and combining element configured to emit, as the excitation light, a part of the first color light emitted from the first light source and emit remaining first color light as light to be diffused; and a diffusion optical element configured to diffuse the light to be diffused emitted from the light separating and combining element and emit the light to be diffused as diffused light.

2. The light source device according to claim 1, wherein the light separating and combining element combines the converted light made incident from the wavelength conversion element and the diffused light made incident from the diffusion optical element, and the emission-position changing mechanism changes an emission position of the converted light emitted from the light separating and combining element and an emission position of the diffused light emitted from the diffusion optical element in a same direction in synchronization with each other.

3. The light source device according to claim 2, wherein the emission-position changing mechanism includes:

a first emission-position changing element provided on an optical path between the light separating and combining element and the wavelength conversion element and configured to change an incident position of the excitation light in the wavelength conversion element and an emission position to the light separating and combining element of the converted light made incident from the wavelength conversion element; and a second emission-position changing element provided on an optical path between the light separating and combining element and the diffusion optical element and configured to change an incident position of the light to be diffused in the diffusion optical element and an emission position to the light separating and combining element of the diffused light made incident from the diffusion optical element, and the emission-position changing mechanism changes, with the first emission-position changing element and the second emission-position changing element, an emission position of the diffused light from the light separating and combining element and an emission position of the converted light from the light separating and combining element in a same direction in synchronization with each other.

4. The light source device according to claim 3, wherein the first emission-position changing element reflects the excitation light emitted from the light separating and combining element toward the wavelength conversion element and reflects the converted light emitted from the wavelength conversion element toward the light separating and combining element, and the second emission-position changing element reflects the light to be diffused emitted from the light separating and combining element toward the diffusion optical element and reflects the diffused light emitted from the diffusion optical element toward the light separating and combining element.

5. The light source device according to claim 3, wherein at least one emission-position changing element of the first emission-position changing element and the second emission-position changing element is an optical path shift device that changes an emission position of light made incident thereon, and the optical path shift device includes:

an optical element including an incident surface on which light is made incident; and a driving element configured to turn the optical element centering on a turning axis extending along at least one direction of two directions included in the incident surface and orthogonal to each other.

6. The light source device according to claim 2, wherein the emission-position changing mechanism displaces the light separating and combining element to thereby change an incident position of the excitation light on the wavelength conversion element, an incident position of the light to be diffused on the diffusion optical element, an emission position of the converted light made incident from the wavelength conversion element and emitted from the light separating and combining element, and an emission position of the diffused light made incident from the diffusion optical element and emitted from the light separating and combining element.

7. The light source device according to claim 6, wherein the emission-position changing mechanism changes, according to a refractive index of the light separating and combining element, an emission position of light transmitted through the light separating and combining element.

8. The light source device according to claim 1, wherein the emission-position changing mechanism changes an emission position of the first color light from the light source device and an emission position of the converted light from the light source device in synchronization with each other such that an optical axis of the first color light emitted from the light source device and an optical axis of the converted light emitted from the light source device substantially coincide.

9. The light source device according to claim 1, further comprising a second light source configured to emit the excitation light, wherein the emission-position changing mechanism includes:

a first emission-position changing element configured to change an emission position from the light source device of the converted light emitted from the wavelength conversion element; and a second emission-position changing element configured to change an emission position from the light source device of the first color light emitted from the first light source, and the first emission-position changing element and the second emission-position changing element change an emission position of the diffused light and an emission position of the converted light from the light source device in a same direction in synchronization with each other.

10. The light source device according to claim 9, wherein at least one emission-position changing element of the first emission-position changing element and the second emission-position changing element is an optical path shift device that changes an emission position of light made incident thereon, and the optical path shift device includes:

an optical element including an incident surface on which light is made incident; and a driving element configured to turn the optical element centering on a turning axis extending along at least one direction of two directions included in the incident surface and orthogonal to each other.

11. The light source device according to claim 1, wherein the light source device causes the emission-position changing mechanism to operate according to incidence of the excitation light on the wavelength conversion element.

12. The light source device according to claim 1, wherein the light source device causes the emission-position changing mechanism to operate according to a cumulative incident time of the excitation light on the wavelength conversion element.

13. A projector comprising:
the light source device according to claim 1;
an image emission device configured to modulate light emitted from the light source device and emit the modulated light as image light; and
a projection optical device configured to project the image light emitted from the image emission device.

14. A light source device comprising:
a first light source configured to emit first color light;
a wavelength conversion element configured to convert a wavelength of excitation light made incident thereon and emit converted light having a wavelength larger than the wavelength of the excitation light; and
an emission-position changing mechanism configured to change an emission position of the incident excitation light to thereby change an incident position of the excitation light on the wavelength conversion element and change an emission position of the first color light and an emission position of the converted light in a same direction in synchronization with each other,
wherein the first color light and the converted light emitted from the emission-position changing mechanism are simultaneously emitted from the light source device in the same direction.

15. The light source device according to claim 14, further comprising:
a light separating and combining element configured to emit, as the excitation light, a part of the first color light emitted from the first light source and emit remaining first color light as light to be diffused; and
a diffusion optical element configured to diffuse the light to be diffused emitted from the light separating and combining element and emit the light to be diffused as diffused light, wherein
the light separating and combining element combines the converted light made incident from the wavelength conversion element and the diffused light made incident from the diffusion optical element, and
the emission-position changing mechanism changes an emission position of the converted light emitted from the light separating and combining element and an emission position of the diffused light emitted from the diffusion optical element in a same direction in synchronization with each other.

16. A light source device comprising:
a first light source configured to emit first color light;
a wavelength conversion element configured to convert a wavelength of excitation light made incident thereon and emit converted light having a wavelength larger than the wavelength of the excitation light;
an emission-position changing mechanism configured to change an emission position of the incident excitation light to thereby change an incident position of the excitation light on the wavelength conversion element and change an emission position of the first color light and an emission position of the converted light in a same direction in synchronization with each other;
a light separating and combining element configured to emit, as the excitation light, a part of the first color light emitted from the first light source and emit remaining first color light as light to be diffused; and
a diffusion optical element configured to diffuse the light to be diffused emitted from the light separating and combining element and emit the light to be diffused as diffused light,
wherein the emission-position changing mechanism is separated from the wavelength conversion element,
the light separating and combining element combines the converted light made incident from the wavelength conversion element and the diffused light made incident from the diffusion optical element, and
the emission-position changing mechanism changes an emission position of the converted light emitted from the light separating and combining element and an emission position of the diffused light emitted from the diffusion optical element in a same direction in synchronization with each other.

* * * * *